United States Patent
Yokomizo et al.

(10) Patent No.: US 7,215,729 B1
(45) Date of Patent: May 8, 2007

(54) FUEL ASSEMBLY AND NUCLEAR REACTOR

(75) Inventors: Osamu Yokomizo, Naka-gun (JP); Yuichiro Yoshimoto, Hitachi (JP); Yoshiyuki Kataoka, Naka-gun (JP); Shinichi Kashiwai, Hitachi (JP); Yasuhiro Masuhara, Hitachi (JP); Akio Tomiyama, Hitachi (JP); Akihito Orii, Hitachi (JP); Kotaro Inoue, Toukai-mura (JP); Takaaki Mochida, Hitachi (JP); Tatsuo Hayashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/470,424

(22) Filed: Jun. 6, 1995

Related U.S. Application Data

(63) Continuation of application No. 07/974,834, filed on Nov. 16, 1992, now Pat. No. 6,278,757, which is a continuation of application No. 07/526,030, filed on May 21, 1990, now abandoned, which is a continuation of application No. 07/163,758, filed on Jan. 14, 1988, now abandoned.

(51) Int. Cl.
*G21C 15/00* (2006.01)
*G21C 19/28* (2006.01)

(52) U.S. Cl. ............... 376/370; 376/210; 376/373; 376/444; 376/352

(58) Field of Classification Search ........... 376/443, 376/444, 352, 370, 435, 209, 210
See application file for complete search history.

(56) References Cited

U.S. PATENT DOCUMENTS

| | | | | |
|---|---|---|---|---|
| 3,208,912 A | * | 9/1965 | Lee, Jr. et al. ............ | 376/171 |
| 3,528,885 A | * | 9/1970 | Kumpf ..................... | 376/444 |
| 3,621,926 A | * | 11/1971 | Townsend ................. | 376/370 |
| 3,725,199 A | * | 4/1973 | Notari et al. .............. | 376/352 |
| 3,910,818 A | * | 10/1975 | Sofer ...................... | 176/54 |
| 4,229,258 A | * | 10/1980 | Takeda et al. ............. | 376/435 |
| 4,587,090 A | * | 5/1986 | Mochida et al. ........... | 376/435 |
| 4,649,021 A | * | 3/1987 | Taleyarkhan ............... | 376/444 |

(Continued)

FOREIGN PATENT DOCUMENTS

| | | | | | |
|---|---|---|---|---|---|
| JP | | 0050498 | * | 4/1971 | ............ 376/444 |

(Continued)

OTHER PUBLICATIONS

Nuclear Engineering International, pp. 14, 15, Jul 1982.*

(Continued)

*Primary Examiner*—James P. Trammell
*Assistant Examiner*—Daniel Lawson Green, Jr.
(74) *Attorney, Agent, or Firm*—Antonelli, Terry, Stout & Kraus, LLP.

(57) ABSTRACT

A resistance member (e.g., fuel holding portion of the lower tie plate) is provided at the lower end of the fuel assembly. Provision is made of a coolant ascending path in which said water rods have coolant inlet ports that are open in a region lower than the resistance member to upwardly guide the coolant, and a coolant descending path which has a coolant delivery port that is open in a region higher than the resistance member to downwardly guide the coolant. The coolant ascending path and the coolant descending path are communicated with each other at their upper end portions.

18 Claims, 17 Drawing Sheets

U.S. PATENT DOCUMENTS

| | | | | |
|---|---|---|---|---|
| 4,675,154 A | * | 6/1987 | Nelson et al. | 376/444 |
| 4,708,846 A | * | 11/1987 | Patterson et al. | 376/444 |
| 4,732,730 A | * | 3/1988 | Gorscak et al. | 376/277 |
| 4,777,016 A | * | 10/1988 | Yoshioka et al. | 376/444 |
| 5,251,246 A | * | 10/1993 | Matzner | 376/444 |

FOREIGN PATENT DOCUMENTS

| | | | | |
|---|---|---|---|---|
| JP | 0052999 | * | 12/1984 | 376/444 |
| JP | 0220686 | * | 12/1984 | 376/444 |
| JP | 0031090 | * | 2/1985 | 376/444 |
| JP | 61 256282 | * | 11/1986 | 376/444 |

OTHER PUBLICATIONS

ASA N1 -1957, A Glossary of Terms in Nuclear Science and Technology, Published by The American Soc. of Mechanical Engineering, N.Y., N.Y. 1957*

* cited by examiner

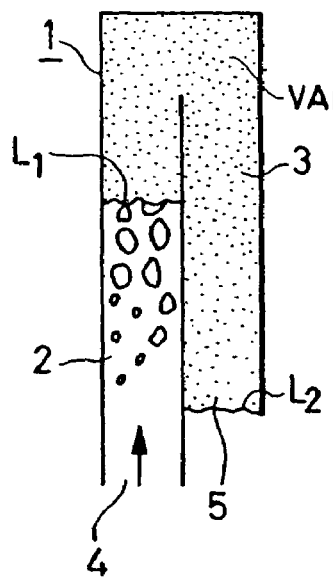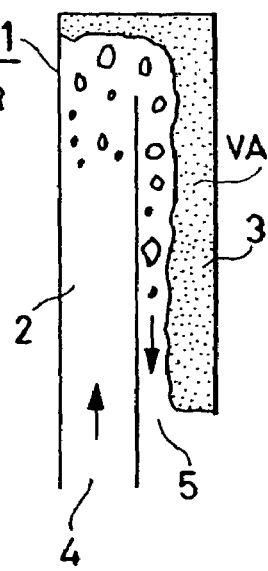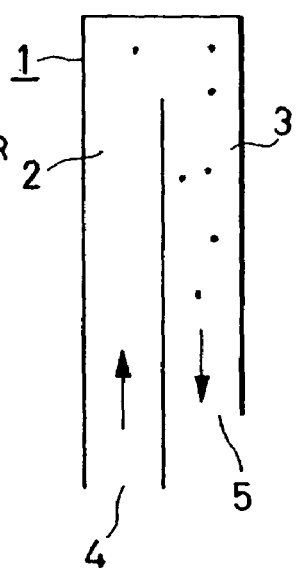
FIG. 3A  FIG. 3B  FIG. 3C
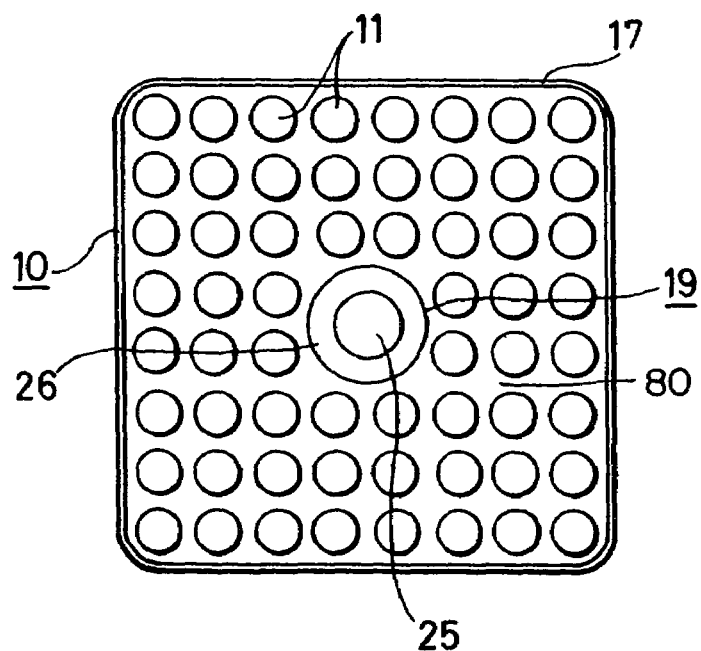
FIG. 6

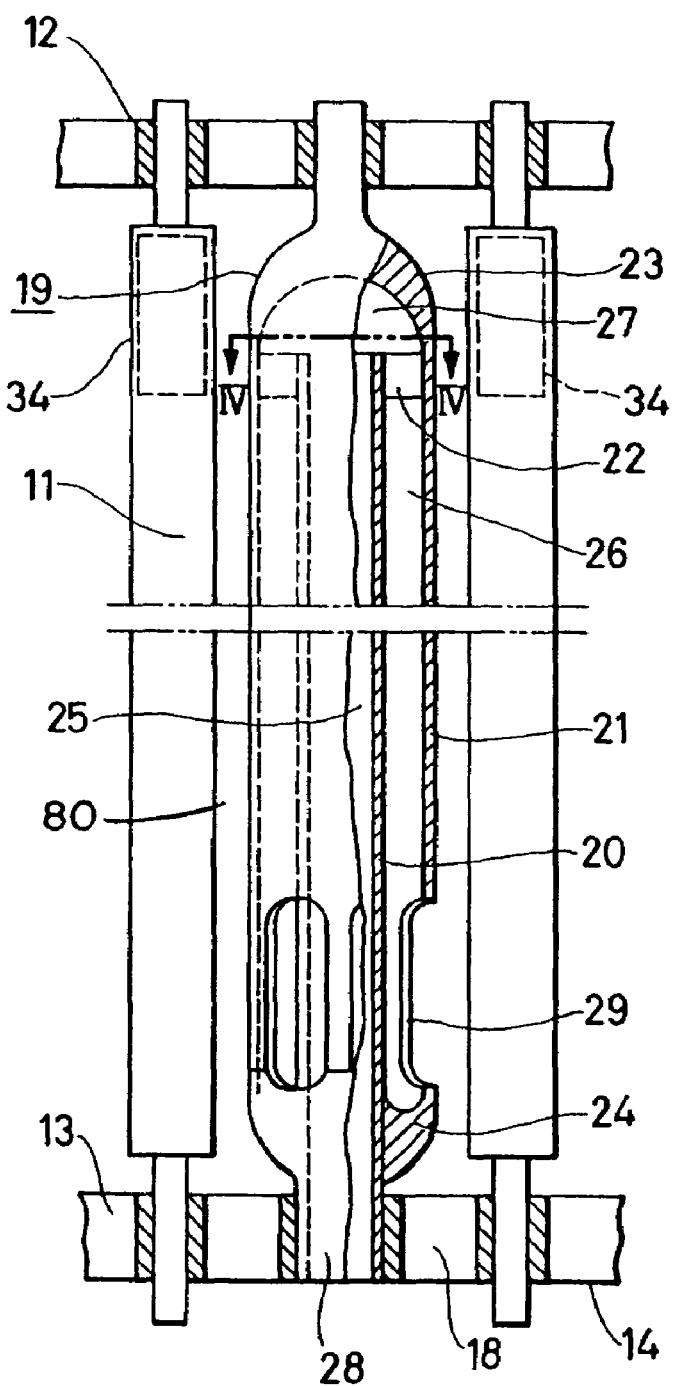
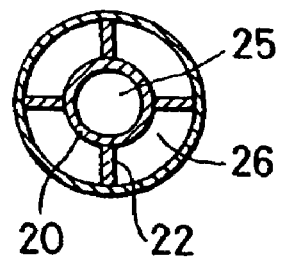
FIG. 7A
FIG. 7B

FUEL ASSEMBLY AND NUCLEAR REACTOR

This application is a continuation of application Ser. No. 07/974,834, filed Nov. 16, 1992, now U.S. Pat. No. 6,278,757, which is a continuation of application Ser. No. 07/526,030, filed May 21, 1990, now abandoned, which is a continuation of application Ser. No. 07/163,758, filed Jan. 14, 1988, now abandoned.

TECHNICAL FIELD

The present invention relates to a fuel assembly, and more particularly to a fuel assembly which can be used in a boiling-water reactor to save the consumption of nuclear fuel substances.

BACKGROUND ART

In a conventional boiling-water reactor as is disclosed in Japanese Patent Laid-Open No. 121389/1979, the reactor core is loaded with a fuel assembly which has a pipe (hereinafter referred to as water rod) in which the cooling water only flows to decelerate the neutrons. Under the operation conditions of the conventional boiling-water reactor, the water rod exhibits an increased reactivity with the increase in the number of hydrogen atoms for uranium atoms, enabling the nuclear fuel substances loaded in the reactor core to be effectively utilized.

In order to more effectively use the nuclear fuel substances, furthermore, it is recommended to change the number of hydrogen atoms in the reactor core as the nuclear fuel substances burn.

Japanese Patent Laid-Open Nos. 125390/1982 and 125391/1982 teach one of the methods. That is, according to these patent publications, provision is made of slow neutron-absorbing water purge rods and intermediate neutron-absorbing water purge rods constituted by a stainless steel which has a larger reactivity value than that of the above water purge rods, and the amount of the cooling water in the reactor core is adjusted by controlling the amount for inserting the water purge rods in the reactor core. The water purge rods serve as means for changing the number of hydrogen atoms in the reactor core. The amount of the cooling water in the reactor core decreases with the increase in the amount for inserting the water purge rods in the reactor core, and the amount of the cooling water increases in the reactor core with the decrease in the amount of insertion. According to the above-mentioned method, water purge rods of different kinds must be newly provided and must be operated by drive means, requiring complex structure and cumbersome operation.

Japanese Patent Laid-Open No. 38589/1986 discloses a fuel assembly which employs static means in order to solve the above-mentioned problems. According to this patent publication, the number of hydrogen atoms is changed by providing fuel rods having a low uranium 235 concentration in the water rod of fuel assembly, and by utilizing the change in the amount of voids in the water rod before and after uranium 235 of the fuel rods extinguishes.

There is a method of adjusting the amount of the cooling water that flows in the reactor core without the need of newly providing operation means such as water purge rods. That is, the cooling water is permitted to flow in small amounts in the reactor core during the start of the fuel cycle, and is then permitted to flow in increased amounts as the fuel cycle proceeds halfway.

Advantages will now be described in the case when the number of hydrogen atoms is changed in the reactor core accompanying the burn of the nuclear fuel substances.

In the case of a typical fuel assembly used for boiling-water reactors, a higher burning degree can be obtained when the operation is carried out at a high void fraction (void fraction, 50%) during the period of a burning degree of 0 to 30 GWD/T and when the operation is carried out at a decreased void fraction (void fraction, 30%) during the period of a burning degree of 30 to 40 GWD/T than when the operation is carried out at a constant void fraction (e.g., at a void fraction of 30%).

This is because, the neutrons have a high average speed and are easily absorbed by uranium 238 when the void fraction is high and the ratio of the number of hydrogen atoms to the number of uranium atoms is small, i.e., when the number of hydrogen atoms is small. The nuclear fuel substances used in the boiling-water reactor contains uranium 235 and uranium 238, uranium 235 occupying several percent of the whole nuclear fuel substances and uranium 238 occupying most of the nuclear fuel substances. Among them, uranium 235 absorbs the neutrons and develops chiefly the nuclear fission, but uranium 238 develops nuclear fission very little. Therefore, the burn-up decreases if uranium 235 burns and decreases.

Uranium 238, however, is converted into plutonium 239 when it absorbes neutrons of a large energy produced by the nuclear fission. Like uranium 235, however, plutonium 239 absorbs decelerated thermal neutrons to develop nuclear fission. The higher the void fraction, the larger the energy of the neutrons and uranium 238 is converted into plutonium 239 at an increased ratio, while suppressing the nuclear fission of uranium 235 and plutonium 239. Therefore, the higher the void fraction, the slower the rate of reduction of the total amount of uranium 235 and plutonium 239.

A high void fraction, however, causes the absolute value of reactivity to decrease. If the void fraction is maintained high, therefore, a minimum level is reached quickly at which the reactivity maintains the criticality compared with when the void fraction is low. Therefore, if the void fraction is lowered at that moment, the neutrons exhibit increased deceleration effect, whereby nuclear fission of uranium 235 and plutonium 239 increases, so that good reactivity is obtained compared with when the fuel substances are burned at a high void fraction that is maintained constant. This makes it possible to burn the core material contained in the nuclear fuel substances for an extended period of time before a minimum reactivity necessary for the criticality is reached.

In the foregoing was mentioned the principle which is called spectrum shift operation for effectively utilizing the nuclear fuel substances by changing the void fraction accompanying the burn of the core material.

Neither the method which provides static means in a simply constructed water rod nor the method which changes the number of hydrogen atoms in the reactor core by changing the amount of the cooling water (called reactor core flow rate) which flows through the reactor core, makes it possible to widely change the void fraction in the reactor core; i.e., these methods can only give small effect in the practical nuclear reactors.

That is, the lower limit of the flow rate in the reactor core is determined by the thermal limit, and the upper limit is determined by the capacity of the circulation pump and the flow-induced vibration. Under the condition where the boiling-water reactor is producing a rated thermal output, therefore, it is allowed to change the void fraction only within a narrow range with the rated 100% flow rate in the reactor core as a center. For example, if the flow rate in the reactor core is allowed to change over a range of from 80 to 120%, then the void fraction can be changed by about 9%.

Even with the structure in which a heat generating member (nuclear fuel substance) of which the calorific power decreases accompanying the burn, is placed in the water rod as disclosed in Japanese Patent Laid-Open No. 38589/1986, the void fraction in the water rod changes by about 30% at the greatest. The water in the water rod does not contribute to the coiling, and it is not allowed to much increase the sectional area of the water rod in the fuel assembly. If it is presumed that the sectional area of the water rod occupies 30% of the cooling water path in the fuel assembly, the effective void fraction change of 30% becomes 9% (30%× 0.3) if it is regarded as the whole fuel assembly. Further, since a fuel rod having a low enrichment is used as a heat generating member, the structure becomes complex and its production involves cumbersome operation.

To achieve a wide range of void fraction change, the flow rate in the water rod should be changed extremely greatly or the calorific power of the nuclear fuel substance in the water rod should be changed greatly. In fact, however, the flow rate or the calorific power cannot be greatly changed without employing the moving portions. Provision of the moving portions, however, poses problems from the standpoint of reliability and makes the mechanism complex.

DISCLOSURE OF INVENTION

The object of the present invention is to provide a fuel assembly which is simply constructed and which is capable of greatly changing the internal average void fraction.

The aforementioned object is achieved by the provision of a resistance member at the lower end portion of the fuel assembly; a coolant ascending path in which the water rods have coolant inlet ports that are open in a region lower than the resistance member; and a coolant descending path which is communicated with the coolant ascending path and which has a coolant delivery port that is open in a region higher than the resistance member, in order to guide the coolant downwardly which is opposite to the direction in which the coolant flows in the coolant ascending path.

As the flow rate of the coolant that passes through the reactor core decreases, the coolant descending path of the water rod is filled with water vapor and as the flow rate of the coolant increases, the amount of water vapor decreases conspicuously in the coolant descending path. Therefore, the reactivity can be increased toward the last period of fuel cycle.

BRIEF DESCRIPTION OF DRAWINGS

FIGS. 3A, 3B and 3C are diagrams illustrating the flow conditions in the water rod at points S, T and U of FIG. 2;

FIG. 6 is a section view along a line III—III of FIG. 4;

FIG. 7A is a local vertical section view of the water rod of FIG. 4;

FIG. 7B is a section view along a line IV—IV of FIG. 7A;

BEST MODE FOR CARRYING OUT THE INVENTION

Figure 1:
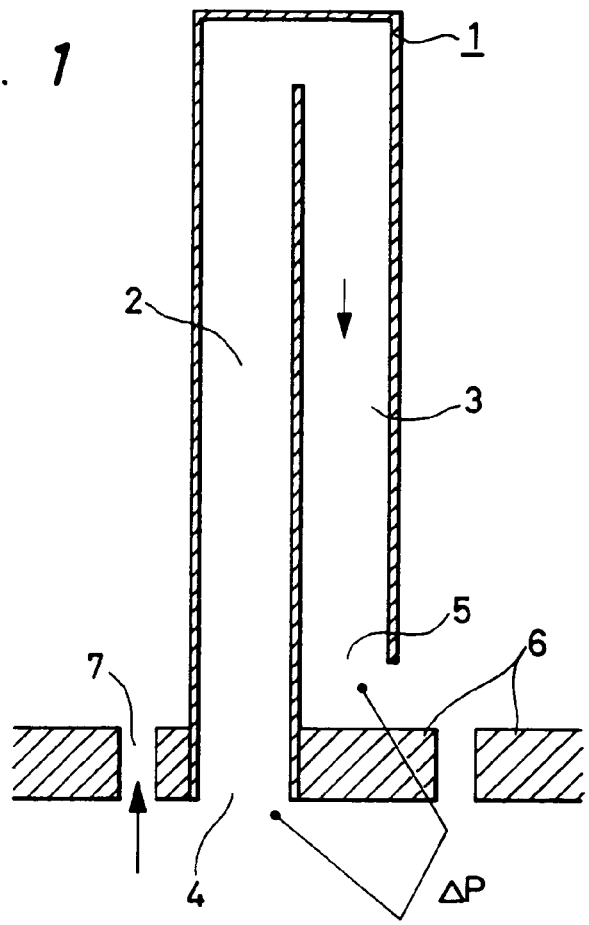
FIG. 1 is a diagram which illustrates the principle of a water rod used in the present invention.

The principle of the present invention will first be described prior to illustrating embodiments of the present invention. FIG. 1 illustrates the structure. Fundamentally, the fuel assembly is provided with a water rod 1 which has a coolant ascending path 2 of which a coolant inlet port 4 is open in a region lower than a resistance member (such as tie plate) 6 provided at a lower portion of the fuel assembly, and which further has a coolant descending path 3 that downwardly guides the coolant from the coolant ascending path and that has a coolant delivery port 5 open in a region higher than the resistance member 6. The resistance member 6 has a plurality of coolant passage ports 7.

The pressure differential ΔP changes between the region lower than the resistance member 6 and the region higher than the resistance member 6 depending upon the change in the flow rate of the coolant (cooling water) that flows through the coolant passage ports 7 formed in the resistance member 6. The pressure differential caused by vena contracta and increase of resistance varies nearly in proportion to the square power of the flow rate of the cooling water. Therefore, if the flow rate of the cooling water passing through the resistance body 6 changes from 80% to 120%, the pressure differential ΔP increases by about 2.25 times.

Figure 2:
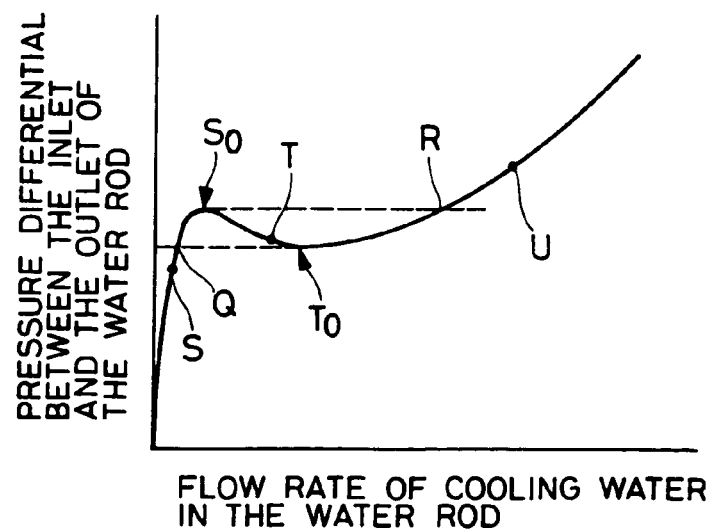
FIG. 2 is a diagram which schematically shows pressure differential characteristics that develop across the outlet and the inlet of the water rod of FIG. 12.

FIG. 2 illustrates a relationship between the flow rate of cooling water in the water rod 1 and the pressure differential between the inlet and the outlet of the water rod 1 (pressure differential between the coolant inlet port 4 and the coolant delivery port 5). If the flow rate of the cooling water is increased starting from zero, the pressure differential between the outlet and the inlet of the water rod 1 once reaches a maximum value. As the flow rate of the cooling water is further increased, the pressure differential between the outlet and the inlet of the water rod 1 once drops to a minimum value, and then increases monotonously. This is due to the phenomenon shown in FIGS. 3A to 3C.

FIG. 3A shows the condition in the water rod 1 at a point S in FIG. 2, FIG. 3B shows the condition in the water rod 1 at a point T in FIG. 2, and FIG. 3C shows the condition in the water rod 1 at a point U in FIG. 2.

Being irradiated with neutrons and gamma rays from the fuel rods around the water rod 1, the cooling water in the water rod 1 generates the heat at a rate of about 0.5 to 2 W/cm$^2$. When the flow rate of the cooling water flowing through the water rod 1 is very small (condition of point S in FIG. 2), the cooling water in the water rod 1 generates the heat and evaporates being irradiated with neutrons and the like. The upper portions of the coolant ascending path 2 and the coolant descending path 3 are then filled with the vapor as shown in FIG. 3A. A liquid level $L_1$ is established in the coolant ascending path 2, and the pressure differential between the outlet and the inlet of the water rod 1 is generated by the difference in the static water head between the liquid level L and the liquid level $L_2$ of the coolant delivery port 5 (outlet of the coolant descending path 3) of the water rod 1. The flow rate of the cooling water that flows into the coolant ascending path 2 maintains balance with respect to the flow rate by which the vapor flows out through the coolant delivery port 5.

As the flow rate of the cooling water is further increased from the point S in FIG. 2, the cooling water flows into the coolant ascending path 2 at a rate that is greater than the amount by which the cooling water is vaporized. In such a case (e.g., at the point T in FIG. 2), the cooling water flows down through the coolant descending path 3 as shown in FIG. 3B. At this moment, the static head in the coolant ascending path 2 is partly cancelled by the weight of the cooling water that flows through the coolant descending path 3, and the pressure differential between the outlet and the inlet of the water rod 1 becomes smaller than the maximum value $S_0$. As the flow rate of the cooling water further increases, however, the unsaturated water introduced through the coolant inlet port 4 is not boiled in the coolant ascending path 2 and the coolant descending path 3 (void fraction is very reduced), and is permitted to flow out through the coolant delivery port 5 (condition of point U in FIG. 2, FIG. 3C). Therefore, the water flows through the coolant ascending path 2 and the coolant descending path 3 almost in the form of a single phase stream. Under the condition of FIG. 3A, therefore, the static water heads at the level of the coolant ascending path 2 and at the level of the coolant delivery port 5 in the coolant descending path 3 are cancelled by each other, so that the difference in the static water head becomes very small. However, since the cooling water flows at a large rate in the water rod 1, the pressure loss increases due to friction and inversion in the flow of the cooling water, and the pressure differential increases again between the outlet and the inlet of the water rod 1.

Owing to the above-mentioned phenomenon, the flow rate of the cooling water in the water rod 1 varies greatly and the void fraction varies greatly even though the pressure differential varies little between the outlet port and the inlet port of the water rod 1.

Therefore, the void fraction can be changed greatly by changing the flow rate of the cooling water (flow rate in the reactor core) that flows in the fuel assembly, if the resistance of the resistance member 6 is so adjusted that the pressure differential between the outlet and the inlet of the water rod 1 is smaller than a pressure differential between the outlet and the inlet of the water rod 1 that corresponds to the minimum value $T_0$ of FIG. 2 when the flow rate in the reactor core is 80% and that the pressure differential between the outlet and the inlet of the water rod 1 is in excess of a pressure differential between the outlet and the inlet of the water rod 1 that corresponds to the maximum value $S_0$ of FIG. 2 when the flow rate in the reactor core is 120%. In the above example, the flow rate of 80% in the reactor core lies on the left side of the maximum value $S_0$ and, preferably, lies on the left side of a point Q (pressure differential between the outlet and the inlet same as the minimum value $T_0$) in FIG. 2, and the flow rate of 120% in the reactor core lies on the right side of the minimum value $T_0$ and, preferably, lies on the right side of the point R (pressure differential between the outlet and the inlet same as the maximum value $S_0$) in FIG. 2.

A preferred embodiment of the invention utilizing the above-mentioned principle, i.e., a fuel assembly to be used in a boiling-water reactor, will now be described in conjunction with FIGS. 4, 5, 6, 7A and 7B.

Figure 5:
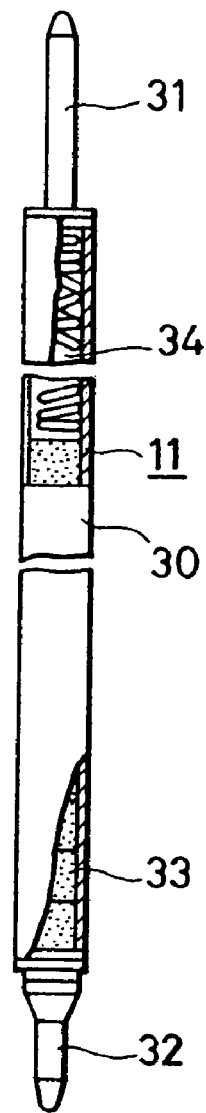
FIG. 5 is a partial section view of a fuel rod shown in FIG. 4.

A fuel assembly 10 of this embodiment is comprised of fuel rods 11, an upper tie plate 12, a lower tie plate 13, a fuel spacer 16, a channel box 17, and a water rod 18. The upper and lower ends of the fuel rods 11 are held by the upper tie plate 12 and the lower tie plate 13. The water rod 19, too, is held at its both ends by the upper tie plate 12 and the lower tie plate 13. Several fuel spacers 16 are arranged in the axial direction of the fuel assembly 10 to maintain an appropriate distance among the fuel rods 11. The fuel spacers 16 are held by the water rod 19. The channel box 17 is mounted on the upper tie plate 12 to surround the outer periphery of a bundle of fuel rods 11 that are held by the fuel spacers 16. The lower tie plate 13 has a fuel rod supporting portion 14 at the upper end and has space 15 under the fuel rod supporting portion 14. The lower ends of the fuel rods 11 and the water rod 19 are supported by the fuel rod supporting portion 14. With reference to FIG. 5, a number of fuel pellets 33 are loaded in a covering tube 30 whose both ends are sealed with an upper end plug 31 and a lower end plug 32. A gas plenum 34 is formed at an upper end of the covering tube 30. The water rod 19 has a diameter (outer diameter of an outer tube 21 that will be mentioned later) which is greater than the diameter of the fuel rod 11, and is arranged at the central portion in the cross section of the fuel assembly 10.

Structure of the water rod 19 will now be described in detail with reference to FIGS. 7A and 7B. The water rod 19 consists of an inner tube 20, an outer tube 21 and a spacer 22. The outer tube 21 and the inner tube 20 are arranged in concentric with each other, and the outer tube 21 surrounds the outer periphery of the inner tube 20. The upper end of the outer tube 21 is sealed with a covering portion 23, and the upper end of the covering portion 23 is held by the upper tie plate 12 being inserted therein. The covering portion 23 covers the upper end of the inner tube 20 so as to form a gap with respect to the upper end of the inner tube 20. The upper rod of the inner tube 20 is secured to the inner surface of the outer tube 21 via plate-like spacers 22 that are radially arranged from the axis of the water rod 19. The lower end of the outer tube 21 is sealed with a sealing portion 24. The lower end of the inner tube 20 penetrates through the sealing portion 24 to protrude downwardly. The lower end of the inner tube 20 penetrates through the fuel rod supporting portion 14 of the lower tie plate 13. A coolant inlet port 28 formed in the lower end of the inner tube 20 is open in the space 15 of the lower tie plate 13. The interior of the inner tube 20 forms a coolant ascending path 25. An annular path formed between the inner tube 20 and the outer tube 21 defines a coolant descending path 26. A plurality of cooling water delivery ports 29 are formed in the wall at the lower end of the outer tube 21 in the circumferential direction. The cooling water delivery ports 29 are formed in the circumferential direction maintaining an equal distance and are open in a region over the fuel rod supporting portion 14. In this embodiment, the fuel rod supporting portion 14 exhibits the function of the resistance member 6 of FIG. 12. The cooling water ascending path 25 and the cooling water descending path 26 are communicated with each other through an inverting portion 27 formed at an upper end of the water rod 19. Thus, the water rod 19 contains therein a cooling water path of an inverted U-shape which consists of the cooling water ascending path 25, the cooling water descending path 26 and the inverting portion 27.

When the fuel assembly 1 of this embodiment is loaded in the reactor core of the boiling-water reactor (the whole fuel assemblies are represented by the fuel assemblies 1) to operate the boiling-water reactor, most the cooling water is directly introduced into space 80 among the fuel rods 11 of the fuel assembly 10 loaded in the reactor core passing through space 15 of the lower tie plate 13 and penetration holes 18 (FIG. 7A) formed in the fuel rod supporting portion 14. The remainder of the cooling water that flows into space 15 of the lower tie plate 13 flows through the coolant inlet port 28 into the coolant ascending path 25 of the water rod 19, and is delivered into the space 80 over the fuel rod supporting portion 14 through the inverting portion 27, the coolant descending path 26 and the coolant delivery ports 29. The cooling water delivered from the cooling water delivery ports 29 may be in the form of a liquid or a gas (vapor) depending upon the flow rate of the cooling water that flows into the water rod 19 through the cooling water inlet port 28 as described earlier. According to this embodiment, the pressure loss by the fuel rod supporting portion 14 and the specifications of the inner tube 20 and the outer tube 21 have been selected in advance, so that the condition of FIG. 3A develops in the water rod 19 when the flow rate in the reactor core is smaller than 100% (flow rate at the maximum value $S_0$ of FIG. 2 in the water rod 19), and the condition of FIG. 3C develops in the water rod 19 when the flow rate in the reactor core is 110% (flow rate at the point R of FIG. 2 in the water rod 19).

Concretely described below is how to operate the boiling-water reactor while changing the void fraction in the water rod 19 under the condition where the fuel assembly 10 is loaded in the reactor core of the boiling-water reactor. This operation method applies for one fuel cycle (operation period of a nuclear reactor from when the fuel in the reactor core is replaced and operation of the nuclear reactor is started to when the nuclear reactor is stopped for renewing the fuel, i.e., usually, one year).

In the boiling-water reactor as disclosed in Japanese Patent Publication No. 11038/1982, Col. 8, line 19 to Col. 10, line 31, the control rods are operated and the flow rate in the reactor core is adjusted to raise the atomic output up to 100% (point N in FIG. 7 of the above publication and 80% flow rate in the reactor core in this embodiment) in order to prevent the fuel from breaking. The flow rate in the reactor core is increased to compensate the reduction of reactor output as the nuclear fuel substance is consumed, i.e., to maintain the reactor output at 100%. When the flow rate in the reactor core has reached 100% owing to the compensation operation, the flow rate in the reactor core is decreased to 20% and the control rods are pulled out until the nuclear reactor produces a predetermined output as disclosed in Japanese Patent Publication No. 11038/1982, Col. 11, line 23 to Col. 12, line 40 (Col. 9, line 47 to Col. 10, line 51 of U.S. Pat. No. 4,279,698). Thereafter, the flow rate in the reactor core is increased to 80% to maintain the reactor output at 100%. To maintain the reactor output at 100%, the control operation is repeated.

According to this embodiment, the output of the nuclear assembly is flattened in the axial direction by utilizing nuclear characteristics. After the flow rate in the reactor core has been decreased, therefore, the control rods are pulled out; i.e., there is no need of pulling out the control rods or there is no need of inserting other control rods unlike the art disclosed in Japanese Patent Publication No. 11038/1982 Col. 12, lines 19 to 29 (U.S. Pat. No. 4,279,698, Col. 10, lines 21 to 34), and what is needed is to pull out only those control rods that are deeply inserted. As described above, the operation for obtaining 100% of reactor output with the flow rate in the reactor core of smaller than 100% is continued for about 70% of a fuel cycle period. During the period of about 70%, the water rod 19 in the fuel assembly 1 assumes the condition as shown in FIG. 3A. That is, the upper portion of the coolant ascending path 25 and the interior of the coolant descending path 26 are filled with the vapor; i.e., the liquid cooling water does not almost exist in the vapor region which is formed in the water rod 19 in the fuel assembly 1 loaded in the reactor core. Therefore, up to 70% of the fuel cycle, the vapor region is formed in the water rod 19, and the cooling water in the reactor core is partly expelled.

It can be said that the fuel assembly 10 according to this embodiment is provided with a water rod that has a vapor reservoir. The coolant descending path 26 works as a vapor reservoir until the flow rate in the reactor core exceeds 100% as will be described later. Formation of the vapor region in the water rod 19 suppresses the effect for decelerating neutrons and promotes the conversion of uranium 238 into plutonium 239 in the nuclear fuel substance. Suppression of the neutron deceleration effect results in the suppression of nuclear fission such as of uranium 235 and results in the decrease in the reactivity. Decrease in the reactivity, however, can be alleviated by pulling out the control rods by an increased amount. During this period, new core materials such as plutonium 239 and the like may be formed, and the core material in the reactor core decreases at a reduced rate. According to this embodiment as described above, the surplus reactivity (surplus neutrons) is absorbed by uranium 238 in the nuclear fuel substances to form a new core material.

By the time when the operation period of the boiling-water reactor reaches about 70% of the fuel cycle, the surplus reactivity in the reactor core will have been lowered to a minimum level for maintaining the criticality. In this case, the flow rate in the reactor core is gradually increased in excess of 100%; i.e., the flow rate in the reactor core is increased to 120% at the time when the operation of a fuel cycle is stopped. The recirculation pump does not hinder the operation at all if the flow rate in the reactor core does not exceed 120%. The output of the nuclear reactor is maintained at 100% from when the flow rate in the reactor core exceeds 100% until when it reaches 120%. When the flow rate in the reactor core is greater than 110%, the interior of the water rod 19 assumes the condition of FIG. 3C where the liquid flows in the form of a single-phase stream and no vapor stays in the coolant descending path 26. As the flow rate in the reactor core becomes greater than 110%, therefore, the amount of cooling water (the number of hydrogen atoms) in the reactor core increases remarkably compared with when the flow rate in the reactor core is smaller than 100%, and whereby the effect increases for decelerating the neutrons, and hence nuclear fission of uranium 235 and the like becomes active. Accordingly, the infinite multiplication factor of the fuel assembly increases and it is made possible to effectively utilize the core materials.

The fuel assembly 1 experiences the fuel cycle operation four times in the reactor core. Therefore, the conditions of FIGS. 3A, 3B and 3C are alternatingly repeated four times each.

Figure 8:
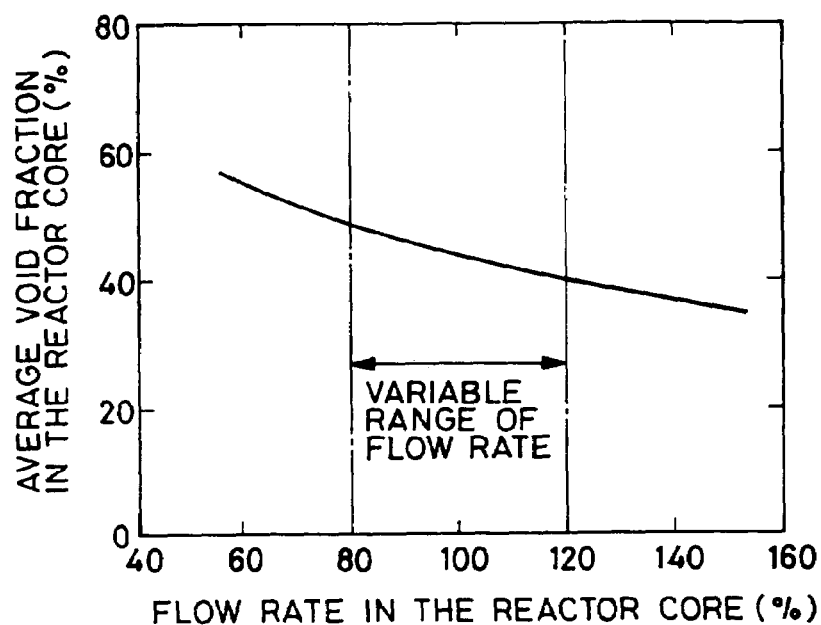
FIG. 8 is a diagram illustrating a relationship between the reactor core flow rate and the average void fraction in the reactor core.

According to the fuel assembly 10 of this embodiment as described above, the water rod is made up of a simply constructed double tube. Therefore, the phase condition of the cooling water in at least the coolant descending path 26 can be successively changed from the gaseous state to the liquid state by means which controls the output of the nuclear reactor (by means which adjusts the flow rate in the reactor core and which may be a recirculation pump). That is, the range in which the average void fraction changes in the fuel assembly 10 can be greatly broadened being added up with the range of void fraction change due to the water rod 19. Concretely speaking, the flow rate in the reactor core in this embodiment is increased to 80 to 120%, so that the average void fraction of the fuel assembly 10 changes as shown in FIG. 8. This is due to the change of void fraction outside the water rod 19. The fuel assembly 10 exhibits an average void fraction change on which is superposed an average void fraction change produced by the water rod 19. Therefore, the nuclear fuel substances can be effectively utilized with a simply constructed structure, and the operation period of a fuel cycle can be greatly extended.

Described below is another operation control to substitute for the aforementioned operation control. According to Japanese Patent Publication No. 44237/1983 (U.S. Pat. No. 4,285,769), a fuel cell constituted by four adjoining fuel assemblies is divided into a controlled cell and a noncontrolled cell, the average enrichment of the controlled cell is selected to be smaller than that of the noncontrolled cell, and the output of the nuclear reactor under the ordinary operation condition is controlled by the control rods only that are inserted in the controlled cell. On Col. 27, line 29 to Col. 28, line 43 of Japanese Patent Publication No. 44237/1983 (U.S. Pat. No. 4,285,769, Col. 16, lines 6 to 65), there is described that the control rods inserted in the controlled cell (c cell) are driven by a control rod driving device of the type of fine movement. After the boiling-water reactor is started, the control rods in the controlled cell and the flow rate in the reactor core are adjusted to maintain 100% output of the nuclear reactor with a 80% flow rate in the reactor core. Reduction of the reactor output due to the consumption of the core material is compensated by increasing the flow rate in the core before the flow rate in the core reaches 100% and after the flow rate has reached 100%, by gradually pulling out the control rods from the controlled cell by the control rod drive device while maintaining the flow rate in the reactor core at 100%. After 70% period of the fuel cycle, operation of the control rods is stopped and the flow rate in the reactor core is gradually increased up to 120%. During the period of up to 70% of the fuel cycle, the water rod 19 is filled with the water vapor as mentioned earlier and after 70% of the fuel cycle, the void fraction in the water rod 19 can be markedly reduced.

In the aforementioned embodiment, the inverting portion 27 is arranged at a position over the position of a gas plenum 34 of the fuel rod 11, i.e., over the upper end of the fuel pellet-filled region. The lower end of the coolant descending path 26 is located at a position at least under the upper end (lower end of gas plenum 34) of the fuel pellet-filled region (region filled with fuel pellets 33) of the fuel assembly 1. In other words, the vapor reservoir of the water rod 19 should be located at a position at least lower than the upper end of the fuel pellet-filled region of the fuel assembly. In particular, in order that the vapor region is uniformly distributed in the axial direction of the fuel pellet-filled region where nuclear fission takes place in the nuclear assembly, the cooling water delivery ports 29 (or vapor delivery ports of the vapor reservoir) of the coolant descending path 26 (vapor reservoir) should be located near the lower end of the fuel pellet-filled region or desirably at a position (near the fuel rod supporting portion 14) under the fuel pellet-filled region. Namely, the vapor region under the condition of FIG. 3A is formed over the full length in the axial direction of the fuel pellet-filled region, and the output distribution of the fuel assembly 1 is flattened in the axial direction.

In this embodiment in which the coolant descending path 26 surrounds the periphery of the coolant ascending path 25, the neutron deceleration effect of when the coolant ascending path 25 and the coolant descending path 26 are substantially filled with liquid cooling water and the effect of converting into plutonium of at least when the coolant descending path 26 is filled with the vapor, can be uniformly imparted to the fuel rods that surround the water rod 19.

By lowering the position of the inverting portion 27 from the upper end of the fuel pellet-filled region, furthermore, there can be employed a short water rod 19 having a length shorter than the fuel rods 11. In this case, pressure loss in the fuel assembly can be decreased.

Referring to FIG. 2, difference in the flow rates in the reactor core between the maximum value $S_0$ and the minimum value $T_0$, pressure differential between the outlet and the inlet of the water rod 19 for the maximum value $S_0$, and pressure differential between the outlet and the inlet of the water rod 19 for the minimum value $T_0$, undergo the change depending upon the sizes of the inner tube 20 and the outer tube 21. This will now be described.

Figure 9:
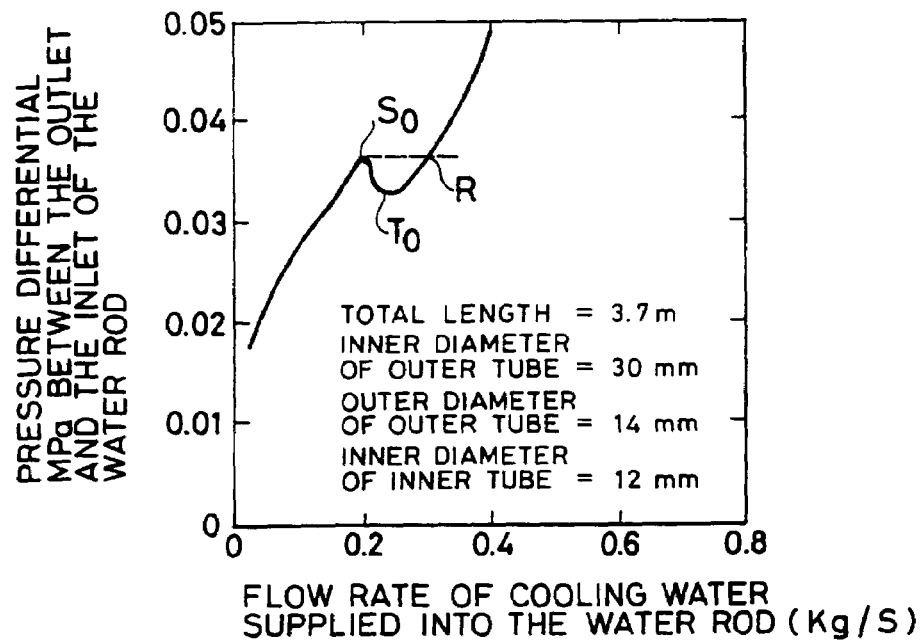
FIGS. 9, 11 and 13 are diagrams illustrating relationships between the pressure differential across the outlet and the inlet of the water rod and the flow rate of cooling water supplied into the water rods having inner tubes of dissimilar sizes.
Figure 10:
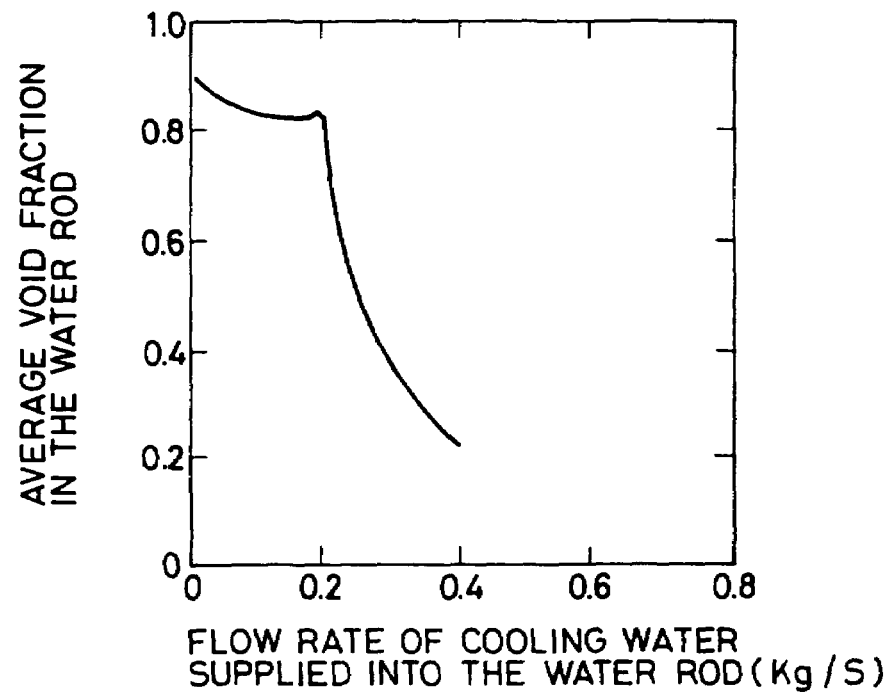
FIGS. 10, 12 and 14 are diagrams illustrating relationships between the average void fraction in the water rod and the flow rate of cooling water supplied into the water rods that correspond to FIGS. 9, 11 and 13.
Figure 11:
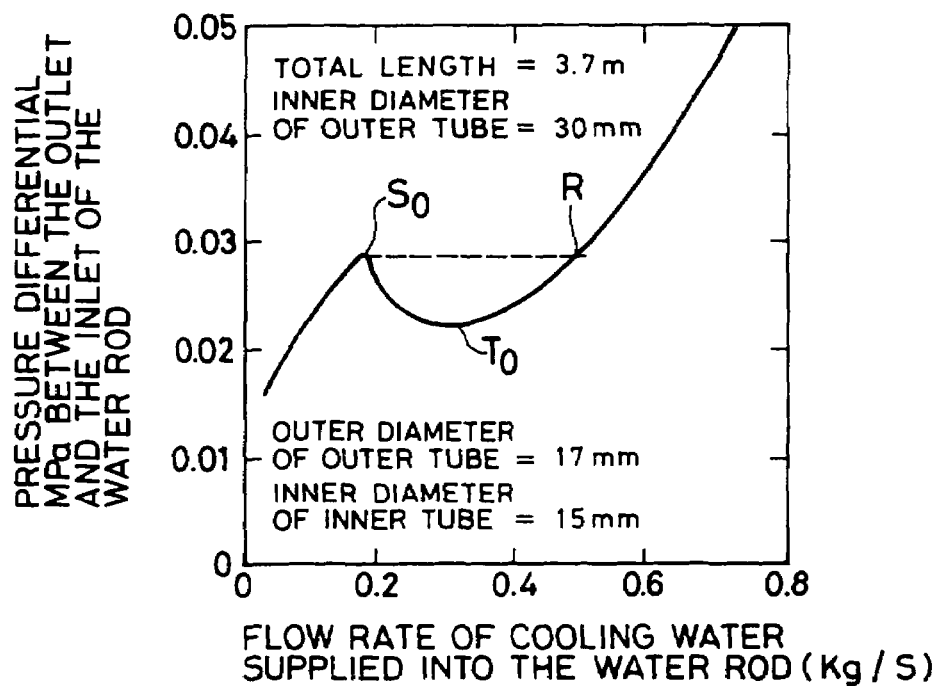
Figure 12:
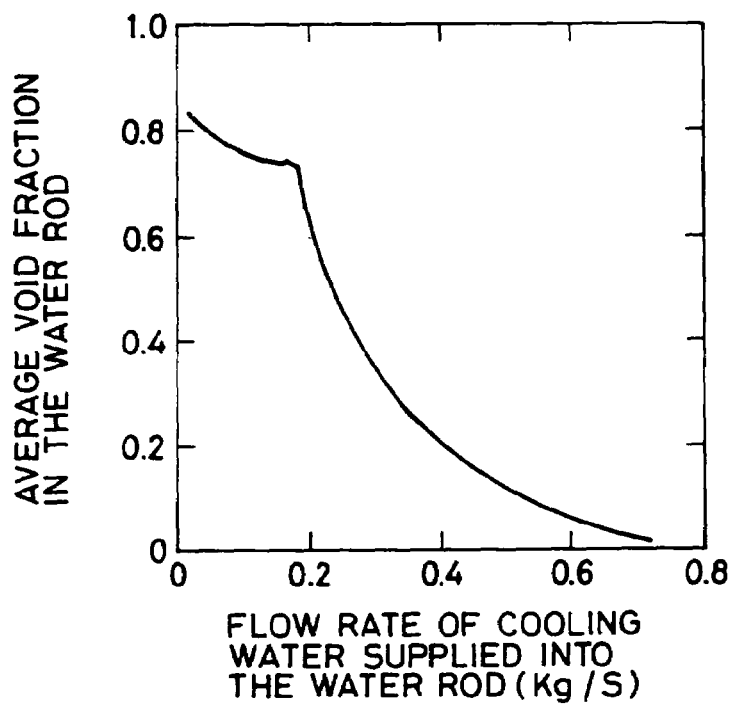
Figure 13:
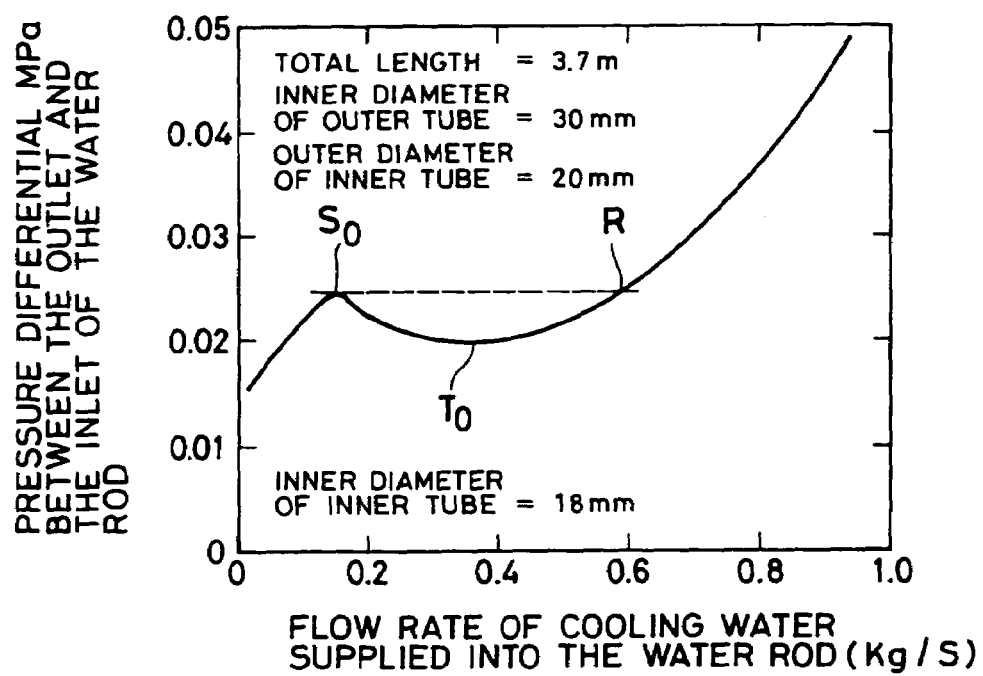
Figure 14:
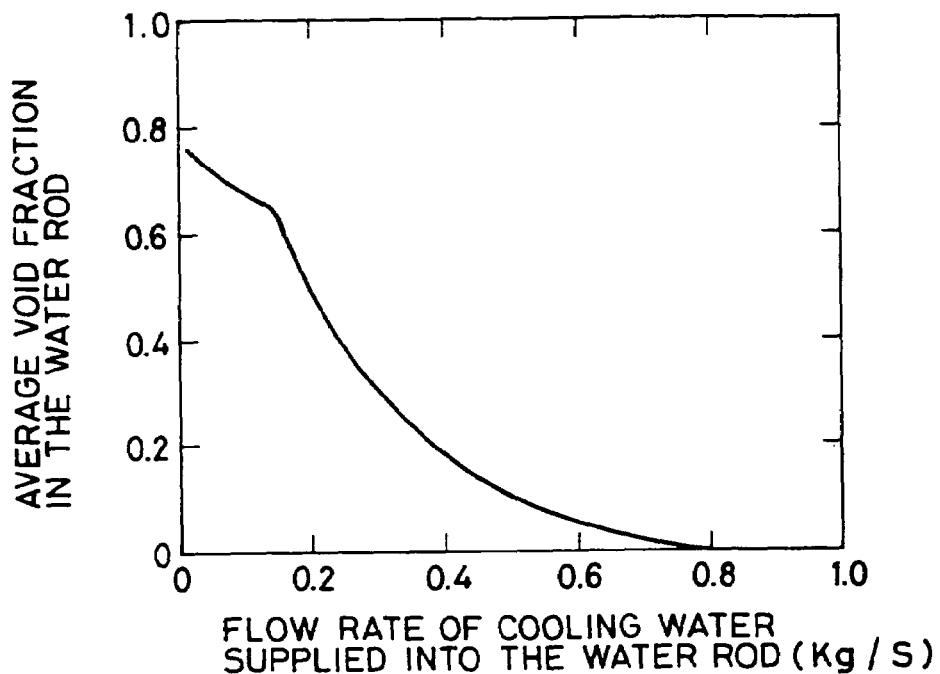

FIGS. 9, 11 and 13 illustrate changes of pressure differential between the outlet and the inlet of the water rod 19 for the flow rate of cooling water supplied into the water rod 19 when the outer tube 21 has an inner diameter of 30 mm and when the inner diameter and outer diameter of the inner tube 20 are changed. FIG. 9 shows the characteristics when the inner tube 20 has an outer diameter of 14 mm and an inner diameter of 12 mm, FIG. 11 shows the characteristics when the inner tube 20 has an outer diameter of 17 mm and an inner diameter of 15 mm, and FIG. 13 shows the characteristics when the inner tube 20 has an outer diameter of 20 mm and an inner diameter of 18 mm. FIGS. 10, 12 and 14 illustrate changes of the average void fraction in the water rod for the flow rate of cooling water supplied into the water rod, that correspond to FIGS. 9, 11 and 13.

When the inner tube 20 is thin as will be obvious from FIG. 9, a maximum value is reached with a flow rate of cooling water which is greater than that of the thick inner tube 20 (FIGS. 11 and 13), and the pressure differential thereafter changes suddenly. Therefore, the range for changing the flow rate of the cooling water is small compared with the range for changing the pressure differential. This is due to the fact that since the inner tube 21 is thin, the heat is generated in small amounts in the inner tube 20 and the flow rate of the cooling water decreases, that surpasses the amount of vapor generated in the inner tube 20, and that the fluid flows through the inner tube 20 at such a high speed that the flow resistance increases. When the sectional area of the coolant descending path 26 between the inner tube 20 and the outer tube 21 is great and the flow rate is small, however, the void is almost 100% in the coolant descending path 26. Therefore, the range in which will change the average void fraction of the water rod having a thin inner tube 20 is little different from that of the water rod having a thick inner tube 20. On the other hand, the thicker the inner tube 20 of the water rod, the smaller the variable range of the pressure differential relative to the variable range of the cooling water. In any case, however, the average void fraction decreases sharply as a maximum value of the pressure differential is exceeded as will be obvious from FIGS. 10, 12 and 14. Referring to FIGS. 9, 11 and 13, furthermore, the average void fraction in the water rod for the flow rate of cooling water greater than a point R is conspicuously smaller than the average void fraction for the flow rate of cooling water smaller than the maximum value $S_0$.

Figure 15:
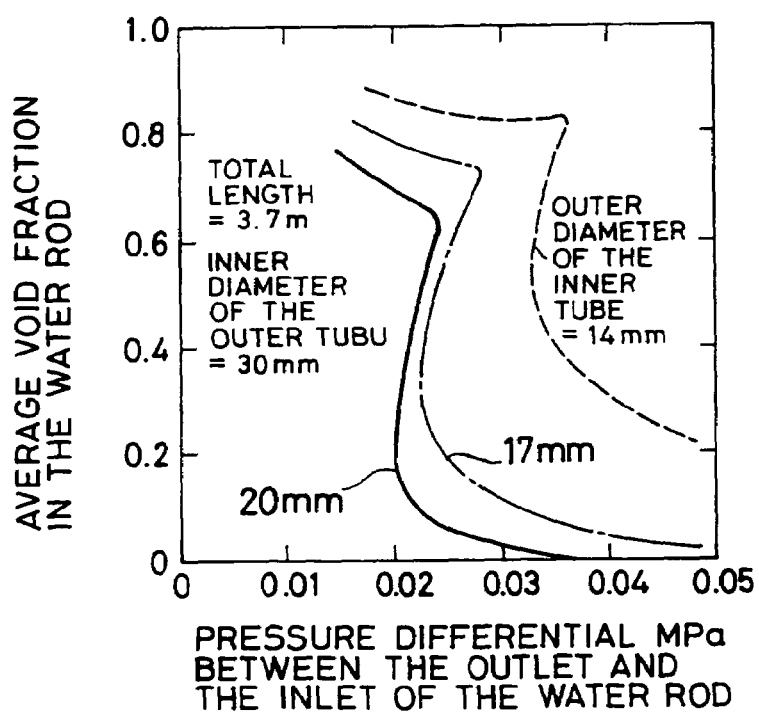
FIG. 15 is a diagram illustrating a relationship between the average void fraction in the water rod and the pressure differential across the outlet and the inlet of the water rod.

FIG. 15 illustrates a relationship between the average void fraction in the water rod 19 and the pressure differential between the outlet and the inlet of the water rod 19, such that the contents of FIGS. 9 to 14 can be easily comprehended. As will be obvious from FIG. 15, the average void fraction of the water rod drops from 76% to 2% when the pressure differential is changed from 0.015 MPa to 0.03 MPa between the outlet and the inlet of the water rod 19 which employs the inner tube having an outer diameter of 20 mm. The pressure loss of the fuel rod supporting portion 14 of the lower tie plate 2 varies nearly in proportion to the square power of the flow rate of cooling water that flows in the fuel assembly 1 as mentioned earlier. Therefore, if the pressure differential between the outlet and the inlet of the water rod is set to be 0.015 MPa when the flow rate of cooling water that flows through the fuel assembly 1 is 80%, the pressure differential becomes 0.034 MPa when the flow rate of cooling water is 120%, and the average void fraction becomes 1% in the water rod. Therefore, the variable range of average void fraction in the water rod 19 is 75%; i.e., the variable range of average void fraction is 7.5% with the fuel assembly 10 as an average. Accordingly, a net variable range of average void fraction of the fuel assembly 10 is 16.5% being added up with 9% by the flow rate in the reactor core of FIG. 8.

Figure 16:
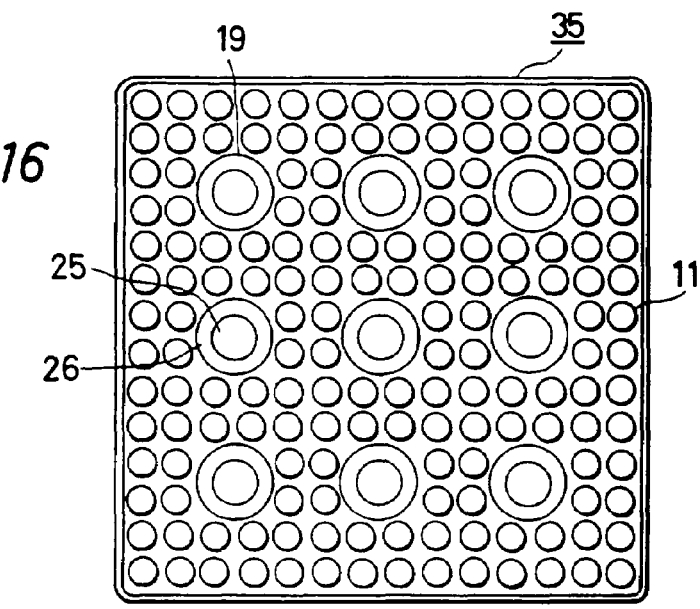
FIG. 16 is a lateral section view of the fuel assembly according to another embodiment of the present invention.

As shown in FIG. 6, the water rod 19 occupies about one-tenth the sectional area of the coolant path of the fuel assembly 10. Here, the variable range of average void fraction of the fuel assembly can be increased by providing two or more water rods 19 in the fuel assembly. To improve fuel economy, there has been proposed a fuel assembly which is provided with nine water rods. In this case, the water rods as a whole occupy about 30% the sectional area of the coolant path of the fuel assembly. A fuel assembly 35 of this embodiment is shown in FIG. 16. The fuel assembly 35 is the one in which the water rods of the fuel assembly disclosed in Japanese Patent Application No. 167972/1986, page 9, line 4 to page 11, line 5, and FIG. 1 are all replaced by the above-mentioned water rods 19. The fuel assembly 35 of this embodiment further exhibits the effect of the fuel assembly 1 of Japanese Patent Application No. 167972/1986 (effect of reactivity gain shown in FIG. 3 of this prior application).

Described below is the operation of the boiling-water reactor in which the fuel assembly 35 of this embodiment is loaded in the reactor core. The whole fuel assemblies in the reactor core is represented by the fuel assembly 35. FIG. 16 illustrates the change of characteristics of the case when the boiling-water reactor loaded with the fuel assembly 35 is operated with two continuous fuel cycles. Broken lines indicate the case of this embodiment and solid lines indicate the case when use is made of the fuel assembly 35 which has conventional rods 19 (without coolant descending path 26). In the former case, the spectrum shift operation is carried out while changing the void fraction and in the latter case, no spectrum shift operation is carried out. The output of the nuclear reactor during the fuel cycle period is controlled by using the method disclosed in Japanese Patent Publication No. 44237/1983. The flow rate in the reactor core should range from 80 to 120% to maintain the output of the nuclear reactor at 100%.

According to this embodiment, the inner tube 20 and the outer tube 21 have been so specified that the condition of FIG. 3A is established in the water rod 19 when the flow rate in the reactor core is smaller than 80% and that the condition of FIG. 3C is established in the water rod 20 when the flow rate in the reactor core is 110%. The flow rate of 80% in the reactor core is the one which corresponds to the maximum value $S_0$ of FIG. 2 at which the cooling water is supplied into the water rod 19, and the flow rate of 110% in the reactor core is the one which corresponds to the point R of FIG. 2 at which the cooling water is supplied into the water rod 19.

Figure 17:
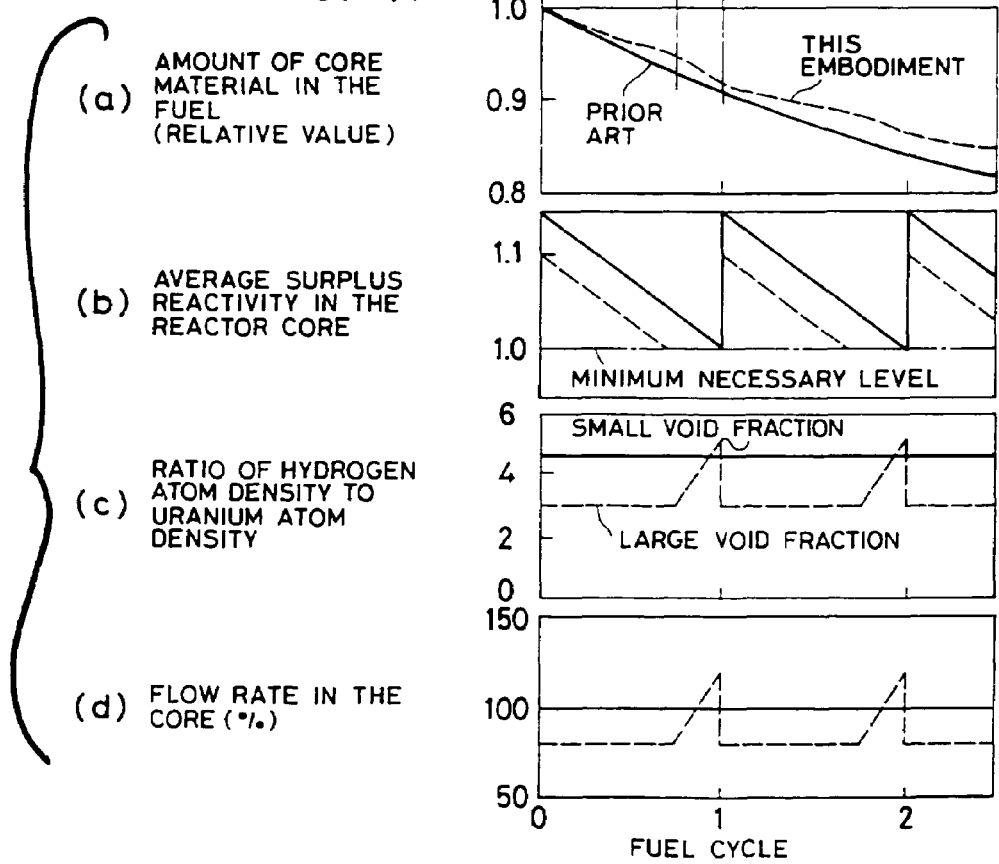
FIG. 17 is a diagram illustrating changes in the amount of core material in the nuclear fuel material for a fuel cycle of the fuel assembly of FIG. 16, average surplus reactivity in the core, ratio of hydrogen atom density to uranium atom density, and flow rate in the reactor core.

During the period of up to 70% of both the first fuel cycle and the second fuel cycle, the flow rate in the reactor core is maintained at 80% as shown in FIG. 17(d) and the change in the output of the nuclear reactor due to the consumption of the core material is compensated by gradually pulling out the control rods using a finely-driving control rod driving device. From 70% of the fuel cycle to the end of the fuel cycle, the flow rate in the reactor core is gradually increased from 80% to 120% while halting the operation of the control rods. With the output of the nuclear reactor being controlled as described above, the surplus reactivity in this embodiment is maintained at a minimum level necessary for criticality for a predetermined period of time (FIG. 17(b)) at the end of each of the fuel cycles. Furthermore, the ratio of hydrogen atom density to uranium atom density greatly increases toward the end of each of the fuel cycles (FIG. 17(c)). The core material in the nuclear fuel material loaded in the reactor core is consumed in small amounts during the period B of from the start of the fuel cycle to 70% of the fuel cycle, and is consumed in large amounts during the period E of from 70% of the fuel cycle to the end of the fuel cycle, as shown in FIG. 17(a).

In this embodiment which employs nine water rods 19, the whole water rods occupy 30% of the sectional area of the coolant path of the fuel assembly 35 as mentioned above, and the variable range of the average void fraction of the fuel assembly 35 is increased by as great as 22.5% owing to the function of nine water rods 19. In practice, however, to this value is further added 9% of FIG. 8. Therefore, the nuclear fuel substances can be very effectively utilized, the period of a fuel cycle can be markedly extended for operating the nuclear reactor, and the fuel assembly 35 can be simply constructed.

It is further possible to change the shape of nine water rods 19 of the fuel assembly 35 (e.g., to differ the inner diameter of the inner tube 20 of nine water rods 19) to vary the transition period from the state of FIG. 3A to the state of FIG. 3C.

FIGS. 18A to 24 illustrate further embodiments of the water rod 19 employed for the fuel assembly 10 and the fuel assembly 35.

Figure 18A:
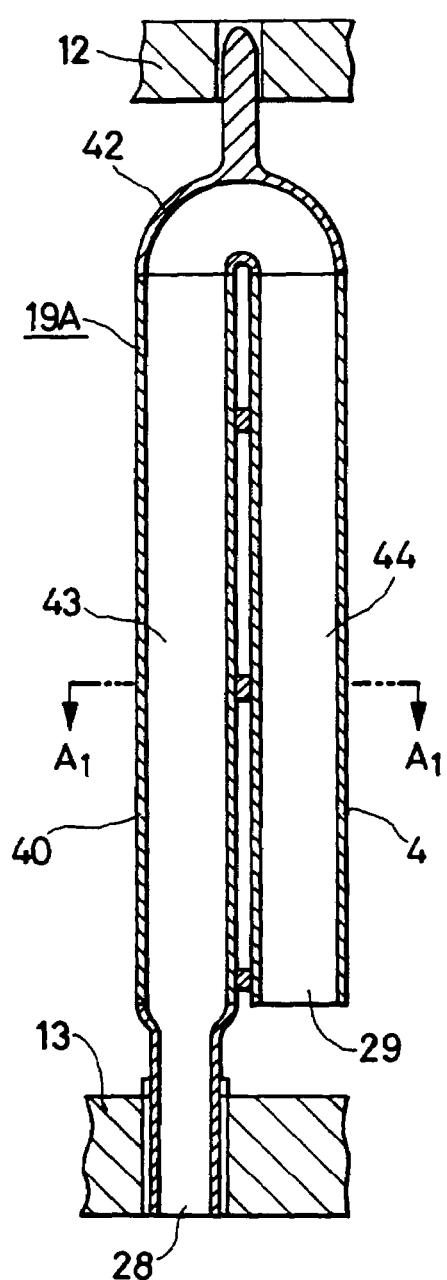
FIGS. 18A, 20 and 24 are vertical section views of water rods according to further embodiments.
Figure 18B:
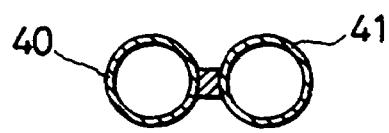
FIG. 18B is a section view along a line $A_1$—$A_1$ of FIG. 18A.
Figure 19:
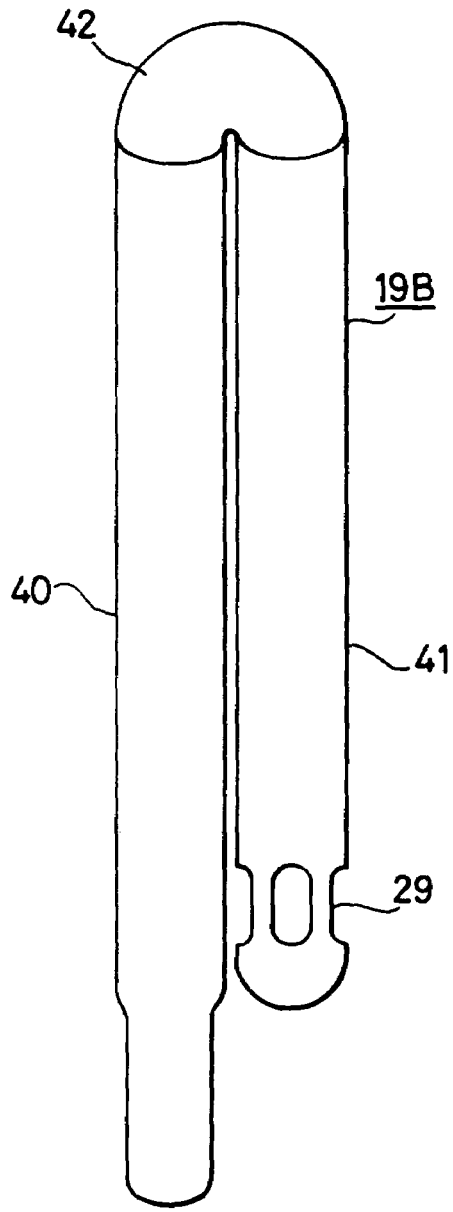
FIGS. 19 and 23 are side views of the water rods according to further embodiments.

In the water rod 19A of FIGS. 18A and 18B, a coolant ascending tube 40 and a collant descending tube 41 are coupled together through a coupling tube 42, thereby to form a coolant ascending path 43 and a coolant descending path 44. The water rod 19A exhibits the function same as that of the water rod 19, but presents an advantage in that the metal has a small sectional area with respect to the area occupied by the water rods. In this embodiment, the coolant delivery port 29 is opened downwardly and may be affected by the dynamic pressure of the cooling water that flows upwardly in the fuel assembly. In the water rod 19B of FIG. 19, the lower end of the descending tube 16 is closed and delivery ports 29 are formed in the side surface of the descending tube 16 so as not to be affected by the dynamic pressure.

Figure 20:
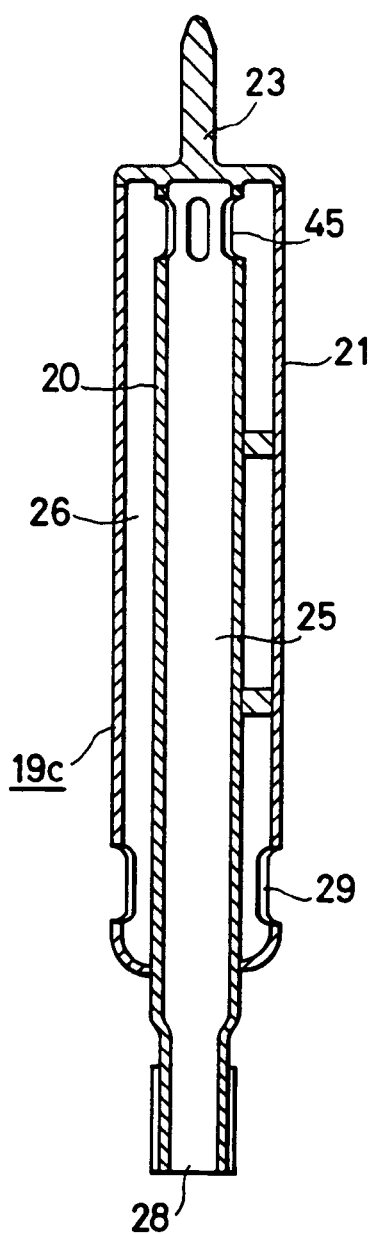

In the water rod 19C of FIG. 20, the upper end of the inner tube 20 of the water rod 19 shown in FIG. 6 is brought into contact with a cover portion 23, and openings 45 are formed at the upper end of the inner tube 20. The water rod 19C is advantageous in regard to easily supporting the weight of the outer tube 21.

In the aforementioned water rods, the members constituting the coolant ascending path and the coolant descending path possessed a circular shape in cross section. The sectional shape, however, needs not be limited to a circle, only, but may be of any shape.

Figure 21:
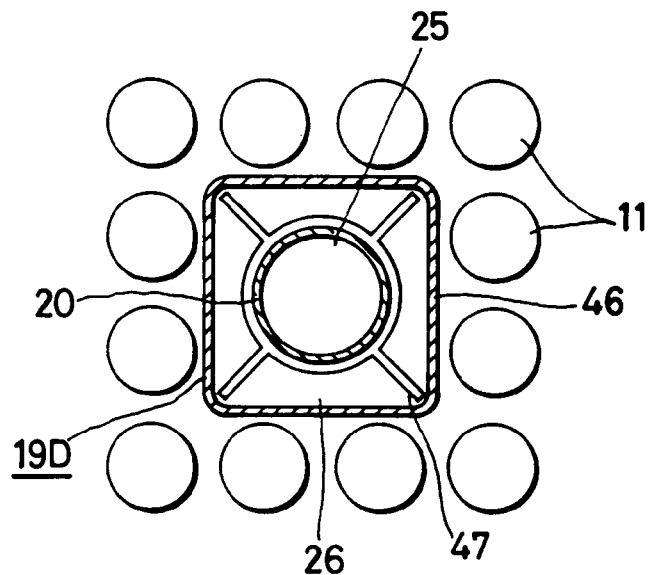
FIGS. 21 and 22 are lateral section views of the water rods according to still further embodiments.

In the water rod 19D shown in FIG. 21, the outer tube 21 of the water rod 19 is replaced by an outer tube 46 that has a nearly rectangular shape in cross section. Reference numeral 47 denotes a spacer that maintains a distance between the inner tube 20 and the outer tube 46, and has the same height as the spacer 22. Compared with the outer cylinder 21 having a circular shape in cross section, this water rod 19D is advantageous in that the sectional area can be windened without disarraying the fuel rods 11.

Figure 22:
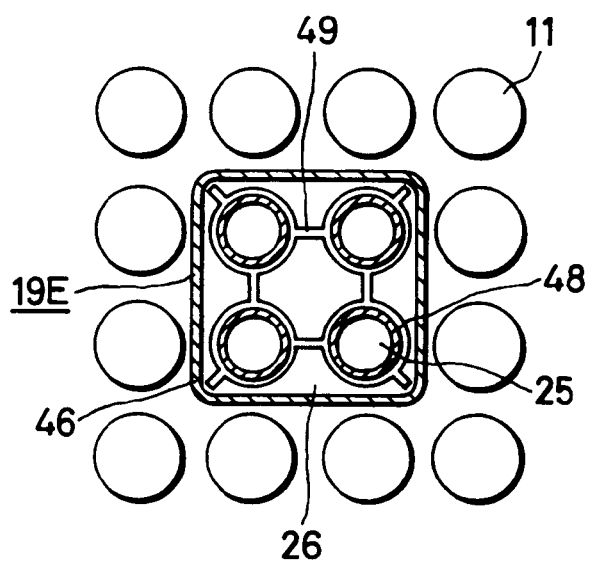

Furthermore, the number of the coolant ascending path 25 and the number of the coolant descending path 26 need not necessarily be corresponded to be 1 to 1. For instance, a plurality of inner tubes 48 and a single rectangular outer tube 46 may be employed to constitute a water rod 19E that is shown in FIG. 22. In this case the holes of the fuel rod supporting portion 14 of the lower tie plate 13 are arranged maintaining the same pitch as that of the fuel rods.

Figure 4:
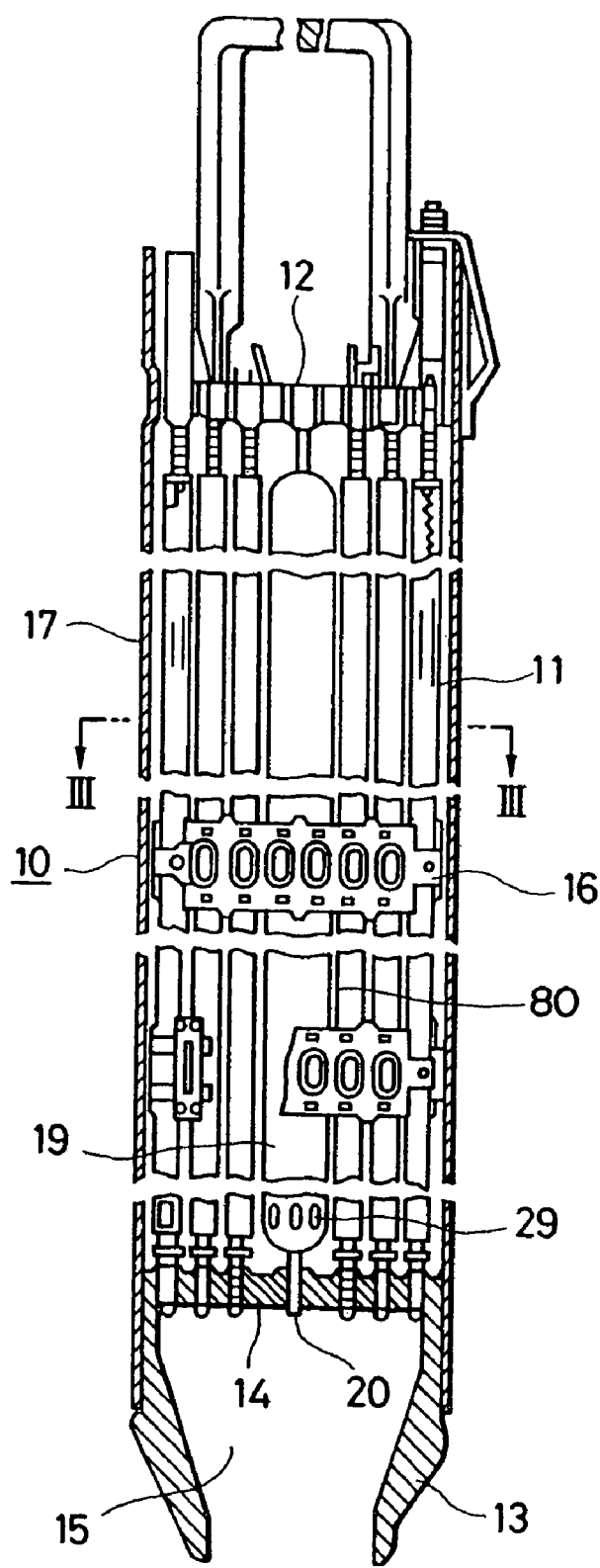
FIG. 4 is a vertical section view of a fuel assembly according to a preferred embodiment of the present invention.

It needs not to be pointed out that the fuel assemblies 10 provided with the water rods of FIGS. 18A to 22 instead of the water rod 19, also exhibit the same effects as the fuel assembly provided with the water rod that is shown in FIG. 4.

Figure 23:
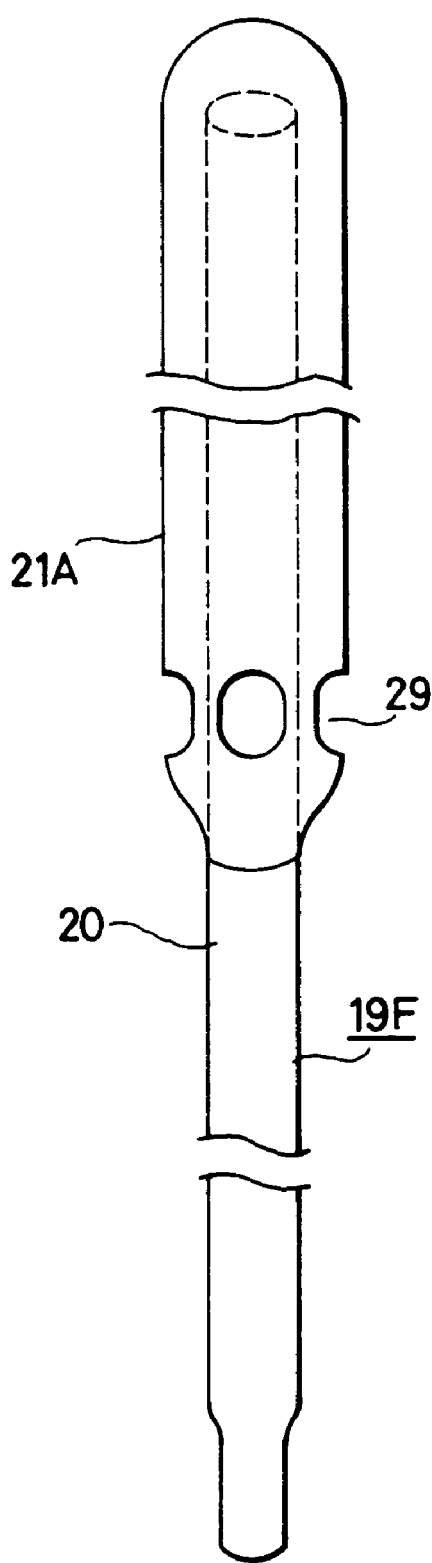

In the water rod 19F shown in FIG. 23, the outer tube 21A has a length one-half that of the outer tube 21 of the water rod 19, and the delivery ports 29 of the coolant descending path 26 are formed at a position of a height one-half the whole length of the fuel assembly in the axial direction. The coolant descending path 26 has a length one-half that of the water rod 19. In the water rod 19F, the difference of static water head decreases between the coolant ascending path 25 and the coolant descending path 26 when the flow rate is small, and a maximum value of pressure differential decreases between the outlet and the inlet of the water rod 19F. On the other hand, to the pressure differential on the outer side of the water rod 19F are added not only the pressure loss of the fuel rod supporting portion 14 of the lower tie plate 13 but also the pressure loss of the fuel assembly, so that there easily develops a pressure differential between the outlet and the inlet of the water rod. Therefore, the pressure loss caused by the lower tie plate 13 can be decreased.

Though the water rods were arranged inside the fuel assembly, the same effects can also be obtained even when the water rods are arranged outside the fuel assembly.

Figure 24:
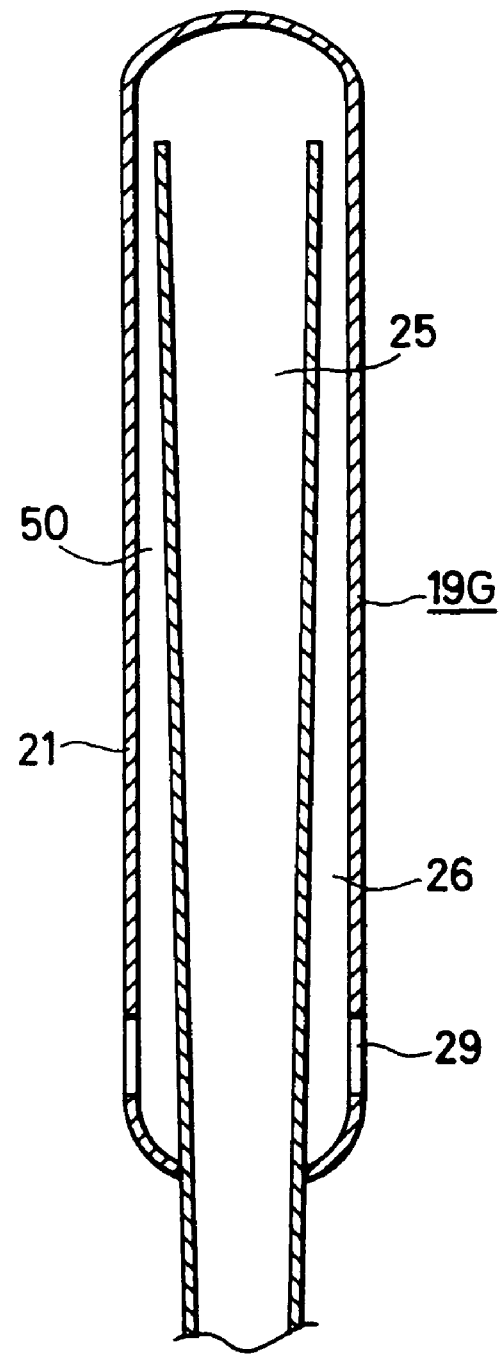

In the water rod, the inner tube and the outer tube need not have the same sectional areas in the lengthwise direction thereof; i.e., an inner tube 50 whose sectional area changes in the axial direction may be used as in a water rod 19G of FIG. 24. In this water rod 19G, the cooling water exists in an increased amount in the upper portion of the reactor core when the flow rate is small, when the coolant descending path 26 is filled with the vapor, and when the liquid condensed water exists only in the coolant ascending path 25 that flares upwardly (condition of FIG. 3A). Outside the water rod 19G, on the other hand, the cooling water exists in large amounts in the lower portion, contributing to uniformalizing the amount of the cooling water in the axial direction of the fuel assembly. The coolant descending path 26 of the water rod 19G has a length of from the upper end to the lower end of the fuel pellet-filled region of the fuel assembly in the axial direction thereof. In the water rod 19G of FIG. 24, the cooling water ascending path 25 has a sectional area that continuously changes upwardly. The coolant ascending path, however, may be divided into two regions having different sectional areas, so that the upper region will have a sectional area greater than that of the lower region. The sectional area is the same in the upper and lower regions of the coolant ascending path 25. The boundary between the two regions of the coolant ascending path 25 is located at a position of one-half the total length thereof from the lower end of the fuel pellet region.

When the fuel assembly shown in FIG. 4 and Table 1 of Japanese Patent Publication No. 29878/1983 (FIG. 4 and Table 1 of U.S. Pat. No. 4,229,258) is provided with the water rod 19G and, particularly, with the coolant ascending path 25 that has different sectional areas in the upper and lower regions, the difference of the enrichment (the upper portion has a higher enrichment than the lower portion) in the upper and lower regions of the fuel assembly can be reduced owing to the function of the water rod. In the fuel assembly, the average enrichment is divided into two regions at a position of one-half the length thereof from the lower end of the fuel pellet-filled region of the fuel assembly. The boundary is located at a position of $\frac{1}{3}$ to $\frac{7}{12}$ of the length thereof in the axial direction from the lower end of the fuel pellet-filled region.

When the sectional area of the coolant ascending path 25 is varied in the upper and lower regions as described above, the position at which the sectional area changes is set to be the same as the position at which the enrichment is divided.

The fuel assemblies having the water rods 19F and 19G exhibit the same effects as those of the fuel assembly 10.

Figure 25:
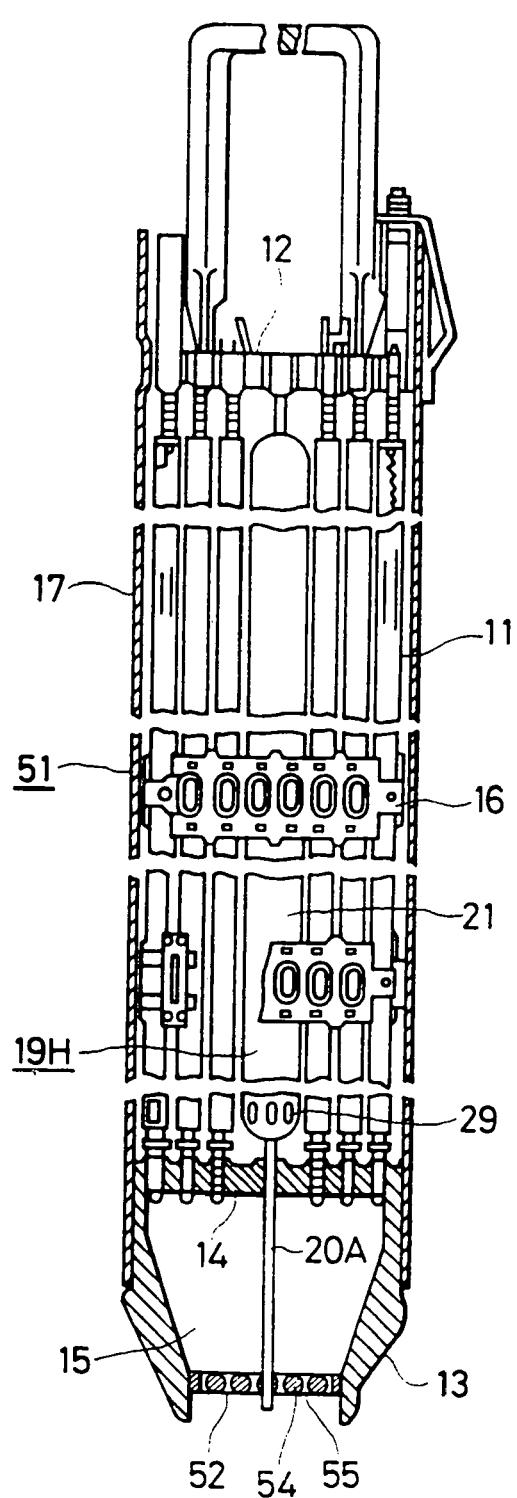
FIG. 25 is a vertical section view of the fuel assembly according to yet further embodiment of the present invention.

FIG. 25 illustrates a fuel assembly according to a further embodiment of the present invention. The fuel assembly 51 of this embodiment is the one in which the aforementioned water rod 19 is adapted to the fuel assembly that is shown in FIG. 15 of Japanese Patent Application No. 126109/1985 (FIG. 15 of Japanese Patent Laid-Open No. 284696/1986; FIG. 12 of the corresponding U.S. application Ser. No. 871,996 filed Jun. 9, 1986). Described below are the differences of this embodiment from the aforementioned fuel assembly 10. The greatest difference is that the fuel assembly 51 has an orifice 52 arranged in space 15 of the lower tie plate 13, and the inner tube 20A of the water rod 19A downwardly extends beyond the orifice 52 penetrating through the fuel rod supporting portion 14 and the orifice 52. The water rod 19H is the one in which the inner tube 20 of water rod 19 of the fuel assembly 10 shown in FIG. 7A is replaced by a longer inner tube 20A, and has the structure same as that of the water rod 19 in other respects. Therefore, the cooling water inlet port (opening at the lower end of the inner tube 20A) 28 of the water rod 19H is open in space 15 under the orifice 52, and coolant delivery ports 29 at the lower end of the outer tube 21 are located at a position over the fuel rod supporting portion 14 but under the fuel pellet-filled region of the fuel assembly 51. A coolant ascending path is formed in the inner tube 20A, and a coolant descending path is formed between the inner tube 20A and the outer tube 21. Like the water rod 19, the inverting portion 27 of the water rod 19H is provided at the position of gas plenum 34 of fuel rods 11, i.e., provided at a position higher than the upper end of the fuel pellet-filled region of the fuel assembly 51. The fuel assembly 10 employs a fuel rod supporting portion 14 of the lower tie plate 13 that serves as a resistance member to produce a pressure differential between the outlet and the inlet of the water rod. The fuel assembly 51, however, employs the fuel rod supporting portion 14 and an orifice 52 as the resistance member. According to this embodiment, therefore, the pressure differential between the outlet and the inlet of the water rod becomes greater than that of the fuel assembly 10.

Figure 26:
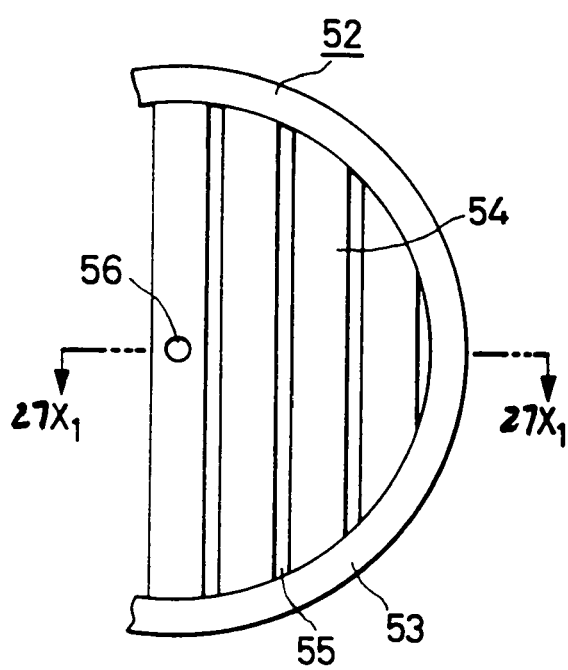
FIG. 26 is a local plan view of the orifice of FIG. 25.
Figure 27:
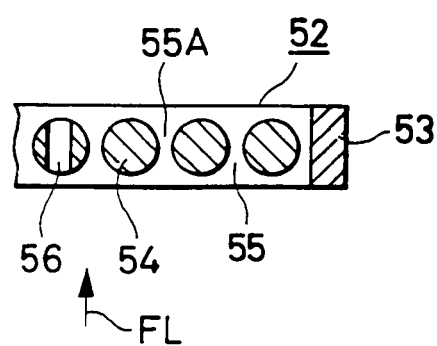
FIG. 27 is a section view along a line $X_1$—$X_1$ of FIG. 26.

The orifice 52 constitutes a resistance device. As shown in FIGS. 26 and 27, the orifice 52 consists of a ring 53 and thirteen round rods (or pipes) 54 having a circular shape in cross section that are mounted in parallel maintaining a distance. Gaps 55 are formed among the neighboring round rods 54 to constitute coolant paths. Reference numeral 55A denotes a throat portion in which the gaps 55 become narrowest. Gaps 55 of the orifice 52 gradually increase from the throat portion 55A toward the upstream side and the downstream side, and are each defined by a pair of side walls (side surfaces of the neighboring round rods 54) constituted by continuous surfaces without corners. The orifice 52 has gaps 54 in a plurality of numbers. The round rods 54 are resistance members which have a sectional shape whose size in a direction at right angles with the direction of coolant flow increases gradually toward the downstream direction (FL) and then decreases gradually.

The ring 53 of orifice 52 is mounted on the inner surface of the lower plenum 13. The orifice 52 is provided at right angles with the axis of the fuel assembly 51. The inner tube 20A of the water rod 19H that penetrates through the fuel rod supporting portion 14, further penetrates through a hole 56 formed in the central round rod 54 of the orifice 52, and downwardly protrudes beyond the orifice 52.

Figure 28:
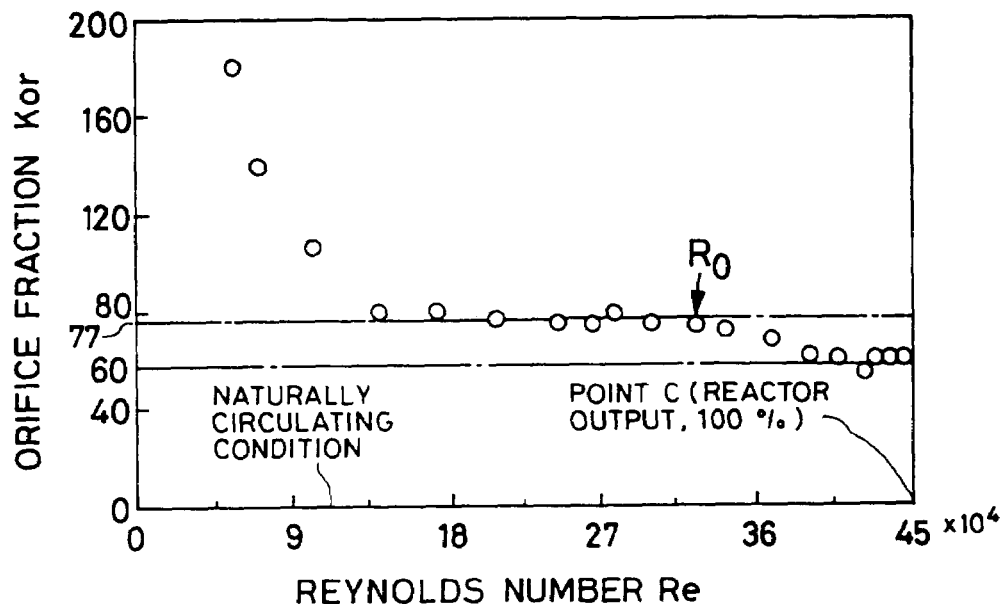
FIG. 28 is a diagram showing a relationship between the Reynolds number and the orifice fraction for an orifice that is smaller than the orifice shown in FIG. 26.
Figure 29:
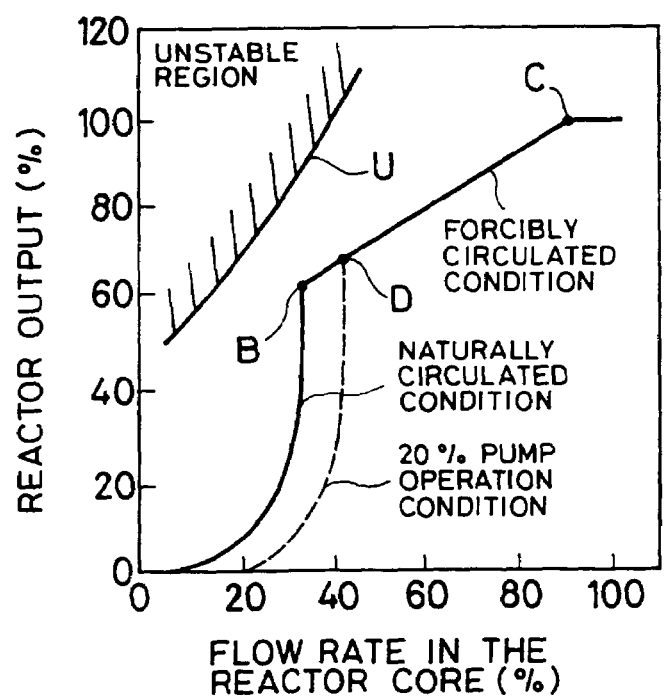
FIG. 29 is a diagram showing a relationship between the flow rate in the reactor core and the output of the nuclear reactor.

Japanese Patent Application No. 126109/1985 describes that the characteristics shown in FIG. 28 were obtained when the flowability was tested using an orifice mentioned on page 8, lines 5 to 9 and 16 of the specification of this application (page 3, upper right column, line 5 to lower left column, line 16 of Japanese Patent Laid-Open No. 284696/1986; page 9, line 11 to page 11, line 2 of the specification of U.S. application Ser. No. 871,996), that was constructed in a small size. In FIG. 28, the abscissa represents the Reynolds number Re and the ordinate represents the orifice fraction Kor. The orifice fraction Kor of the above small orifice becomes about 77 near at $Re=13\times10^4$ that corresponds to the naturally circulating condition (point B of FIG. 29) of the boiling-water reactor, and becomes about 60 at $Re=45\times10^4$ that corresponds to 100% reactor output (point C of FIG. 29) of the boiling-water reactor. The orifice fraction Kor at the point C of FIG. 29 is lower by about 22% than that at the point B of FIG. 29. Therefore, the pressure loss at the point C is smaller by about 22% than that at the point B. The orifice fraction Kor of the orifice 5 is about 77 which remains nearly constant over a range of from $Re=13\times10^4$ to $Re=30\times10^4$, and gradually decreases when Re becomes greater than $30\times10^4$. The point of $Re=30\times10^4$ corresponds to the moment of when the flow rate in the core is about 60% in FIG. 29.

The reason why the characteristics shown in FIG. 28 are obtained has been taught on page 10, line 17 to page 12, line 18, and in FIGS. 27 and 28 of the specification of Japanese Patent Application No. 126109/1985 page 3, lower right column, line 17 to page 4, upper right column, line 18 and FIGS. 27 and 28 of Japanese Patent Laid-Open No. 284696/1986; page 11, line 25 to page 14, line 5, and FIGS. 9 and 10 of the specification of U.S. application Ser. No. 871,996). The specification of Japanese Patent Application No. 126109/1985 describes on page 13, lines 8 to 15 and in FIGS. 29(A) to 29(F) (page 4, lower left column, lines 8 to 15, and FIGS. 29(A) to 29(F) of Japanese Patent Laid-Open No. 284,696/1986; page 14, lines 15 to 25, and FIGS. 11A to 11F of the specification of U.S. application Ser. No. 871,996) that the bars having any other sectional shape may be used instead of the round rods.

The orifice used in this embodiment has a pressure loss transition region in which the pressure loss decreases for the flow rate of 80 to 110% in the reactor core.

As the flow rate in the reactor core increases and the Reynolds number Re exceeds the critical Reynolds number Rec, the pressure loss of the orifice 52 starts to decrease as shown in FIG. 28. At a moment when the reactor output is 100% (point C in FIG. 29), the pressure loss decreases remarkably compared with the pressure loss at the moment of point D. Using the fuel assembly 51 of this embodiment, therefore, the flow rate of the cooling water delivered from the recirculation pump at the point C of FIG. 29 is smaller, by an amount that corresponds to the reduction of pressure loss of the orifice 52, than the flow rate of the cooling water delivered from the recirculation pump at the point C in FIG. 29 in the boiling-water reactor loaded with the fuel assembly 10. In this embodiment, the capacity of the recirculation pump is equal to that of the pump used in the water-boiling reactor loaded with the fuel assembly 10. Using the fuel assembly 51 of this embodiment, therefore, the flow rate in the reactor core increases more than that of the prior art after the point C of FIG. 29 is reached. That is, in the boiling-water reactor loaded with the fuel assembly 10, the flow rate in the reactor core of 120% was an upper limit. In the boiling-water reactor loaded with the fuel assembly 51, however, the flow rate in the reactor core can be increased in excess of 120%. By providing the fuel assembly 51 of this embodiment, therefore, the output of the nuclear reactor can be controlled over a wide range by controlling the flow rate in the reactor core.

In case the recirculation pump has tripped when the nuclear reactor is in operation at 100% output, the flow rate in the reactor core decreases and the cooling water in the reactor core is placed under the naturally circulating condition. Accompanying the reduction of the flow rate in the reactor core, the output of the nuclear reactor decreases along a straight line BC in FIG. 29 down to the point B. Thus, as the flow rate in the core is placed under the naturally circulating condition, the orifice fraction Kor of the orifice 52 increases. Therefore, the fuel assembly of this embodiment prevents the flow rate in the reactor core from losing stability when it is placed under the naturally circulating condition (operation is prevented from plunging into the unstable region of FIG. 29).

The water rod 19H of the fuel assembly 51 of this embodiment is so constituted that the condition of FIG. 3A takes place when the flow rate is smaller than 100% in the reactor core and that the condition of FIG. 3D takes place when the flow rate is greater than 110% in the reactor core. Therefore, the water rod 19H of the fuel assembly 51 works in the same way as the water rod 19 of the fuel assembly 10 mentioned earlier, and the fuel assembly 51 produces the same effects as the fuel assembly 10.

Figure 30:
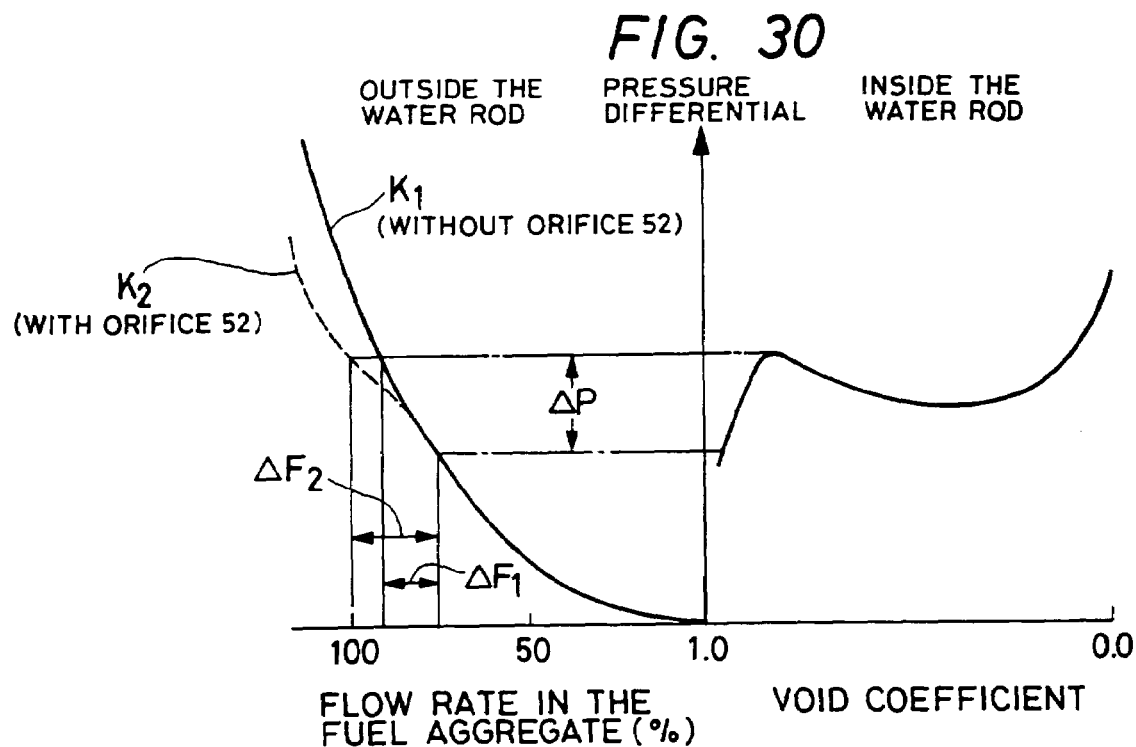
FIG. 30 is a diagram illustrating the change in the pressure differential inside and outside the water rod.

Furthermore, the fuel assembly 51 which is provided with the orifice 52 makes it possible to vary the void fraction over a wide range of flow rate in the reactor core compared with the fuel assembly 10. Since the pressure loss by the orifice 52 decreases (FIG. 28), the flow rate in the reactor core can be varied greatly to change the flow in the water rod 19H. This will be explained in conjunction with FIG. 30, wherein the left side shows the flow condition of cooling water in a region outside the water rod 19H and the right side shows the flow condition of cooling water in the water rod 19H. On the left side of FIG. 30, a curve $K_1$ of a solid line represents flow characteristics of the fuel assembly having the fuel rod supporting portion 14 without orifice 52, and a curve $K_2$ of a broken line represents flow characteristics of the fuel assembly of when it is presumed that the fuel rod supporting portion 14 is replaced by the orifice 52. Symbol $\Delta P$ of FIG. 30 represents a width in which the pressure differential of the fuel assembly changes between the coolant inlet port 28 and the coolant delivery port 29 of the water rod 19H. In other words, $\Delta P$ represents a width in which the pressure differential changes between the coolant inlet port 28 and the coolant delivery port 29 of the water rod 19H. To produce the variable width $\Delta P$, the flow rate of cooling water that flows through the fuel assembly is increased by $\Delta F_1$ on the curve $K_1$ and is increased by $\Delta F_2$ on the curve $K_2$. By using the orifice 52 of which the pressure loss decreases with the increase in the flow rate in the reactor core, as described above, the range increases in which the flow rate in the reactor core varies to obtain the same range of pressure differential change as that of when the orifice 52 is not employed. This is advantageous not only when the spectrum-shift operation is carried out but also when the output of the nuclear reactor is controlled relying upon the flow rate in the reactor core.

Figure 31:
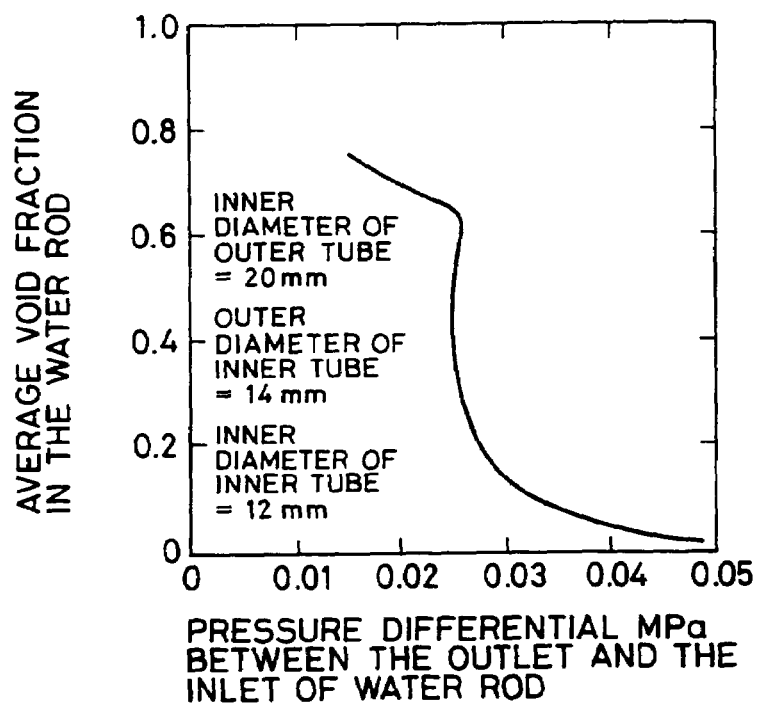
FIG. 31 is a diagram showing a relationship between the average void fraction in the water rod and the pressure differential across the outlet and the inlet of the water rod that has an outer tube with an inner diameter of 20 mm and an inner tube with an inner diameter of 12 mm.

When the pressure differential characteristics in the water rod has a distinct maximum value and a distinct minimum value as represented by a curve on the right side of FIG. 30, the transition is started along the characteristics curve on the right side of the maximum value when the maximum value is exceeded even by a slightest amount, and it is not allowed to flatten the pressure differential between the outlet and the inlet of the water rod. However, when the pressure differential between the outlet and the inlet of the water rod changes flatly as shown in FIG. 31, the orifice 52 is effective to flatten the flow rate in the reactor core vs. void fraction characteristics on the right side of the maximum value. FIG. 31 illustrates characteristics of the water rod 19 (FIG. 7A) which is constituted using an outer tube 21 having an inner diameter of 20 mm and an inner tube 20 having an outer diameter of 14 mm and an inner diameter of 12 mm.

As described above, the fuel assembly 51 provided with the water rod 19H and the orifice 52 produces a variety of effects. Furthermore, the fuel assembly 51 helps achieve the effects as described below. That is, in the boiling-water reactor equipped with the fuel assembly 51 of this embodiment, reduction in the output of the nuclear reactor due to the consumption of core material is compensated by increasing the flow rate in the reactor core over a range of 80% to 100% in which the flow rate in the reactor core changes. Since the fuel assembly 51 is provided with the orifice 52, the pressure differential between the outlet and the inlet of the water rod 19H varies less sensitively relative to fluctuation in the flow rate in the reactor core. This also contributes to increasing the range in which the flow rate in the reactor core varies to compensate the reduction of reactor output due to the consumption of the core material.

Figure 32:
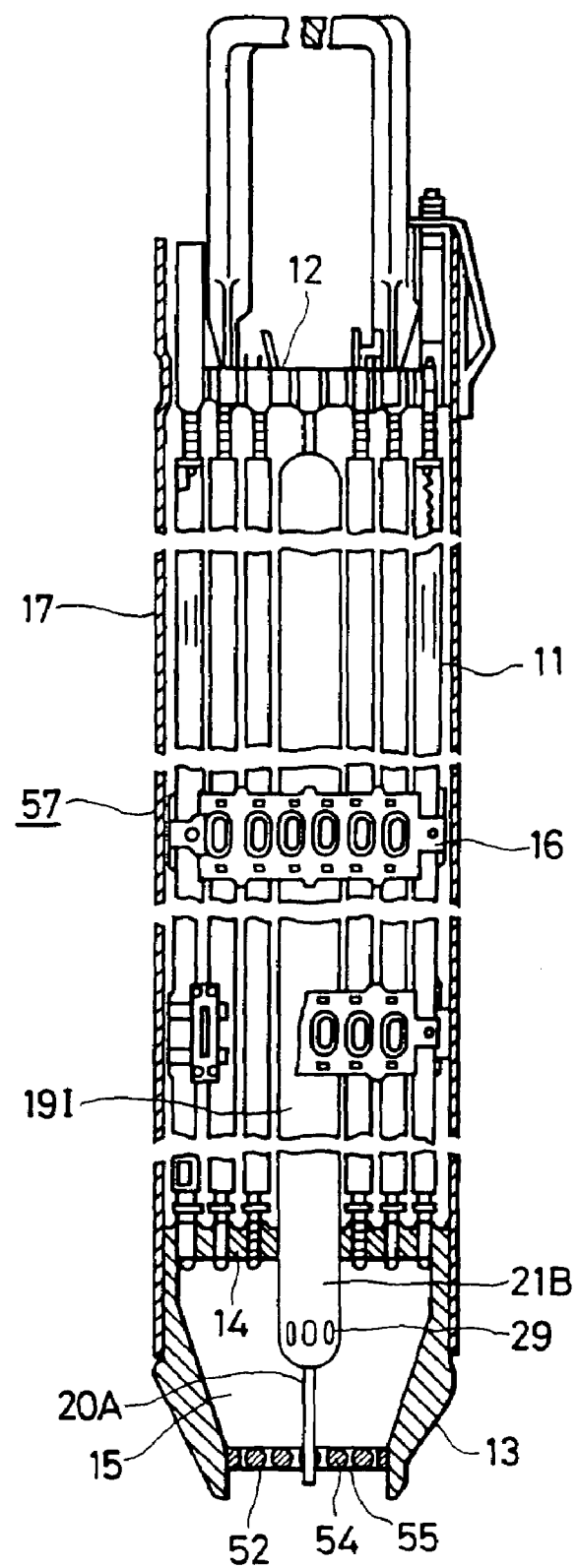
FIG. 32 is a vertical section view of a fuel assembly according to a further embodiment of the present invention.

A further embodiment of the present invention employing the orifice 52 will be described in conjunction with FIG. 32. In a fuel assembly 57 of this embodiment, the water rod 19H employed in the fuel assembly 51 is replaced by a water rod 19I which consists of an inner tube 20A and an outer tube 21B. In other respects, the structure is the same as that of the fuel assembly 51. Further, the water rod 19I has the same structure as the water rod 19, except that the inner tube 20A and the outer tube 21B are longer than the inner tube 20 and the outer tube 21 of the water rod 19 of FIG. 7A. The outer tube 21B penetrates through the fuel rod supporting portion 14 to reach the space 15, but does not penetrate through the orifice 52. Hence, coolant delivery ports 29 formed at the lower end of the outer tube 21B are open in space 15 between the fuel rod supporting portion 14 and the orifice 52. The fuel assembly 57 uses the orifice 52 as a resistance member that produces a pressure differential between the outlet and the inlet of the water rod 19I. The fuel rod supporting portion 14 of this embodiment does not serve as the above-mentioned resistance member. Therefore, the pressure differential produced across the outlet and the inlet of the water rod 19I becomes smaller than the pressure differential produced thereacross of the water rod 19H.

However, the fuel assembly 57 provided with the water rod 19H and the orifice 52 exhibits the same effects as those of the fuel assembly 51 mentioned earlier.

In the fuel assembly 57, the cooling water delivered from the coolant delivery ports 29 of the water rod 19I is supplied into space among the fuel rods 11 via the fuel rod supporting portion 14. Therefore, the flow rate of cooling water that passes through the fuel rod supporting portion 14 becomes greater than that of the fuel assembly 51 and the fuel assembly 10, and the pressure loss increases in the fuel rod supporting portion 14 compared with the fuel assembly and the fuel assembly 10. Furthermore, the fuel assembly 57 is cumbersome to fabricate compared with the fuel assembly 51. In the fuel assembly 57, on the other hand, the pressure differential is generated by the orifice 52 only to flow the cooling water into the water rod 19I as mentioned earlier.

Therefore, the width in which the pressure loss decreases becomes relatively great compared with that of the fuel assembly 51. Therefore, the range increases in which the flow rate in the reactor core can be changed.

The water rods shown in FIGS. 18A to 24 and the structure mentioned in relation to these water rods can be adapted to the fuel assemblies 51 and 57, as a matter of course.

When there is no need of changing the pressure loss unlike the orifice 52, a generally employed orifice plate having a round hole may be used instead of the orifice 52 of the fuel assembly 51 or 57.

Figure 33:
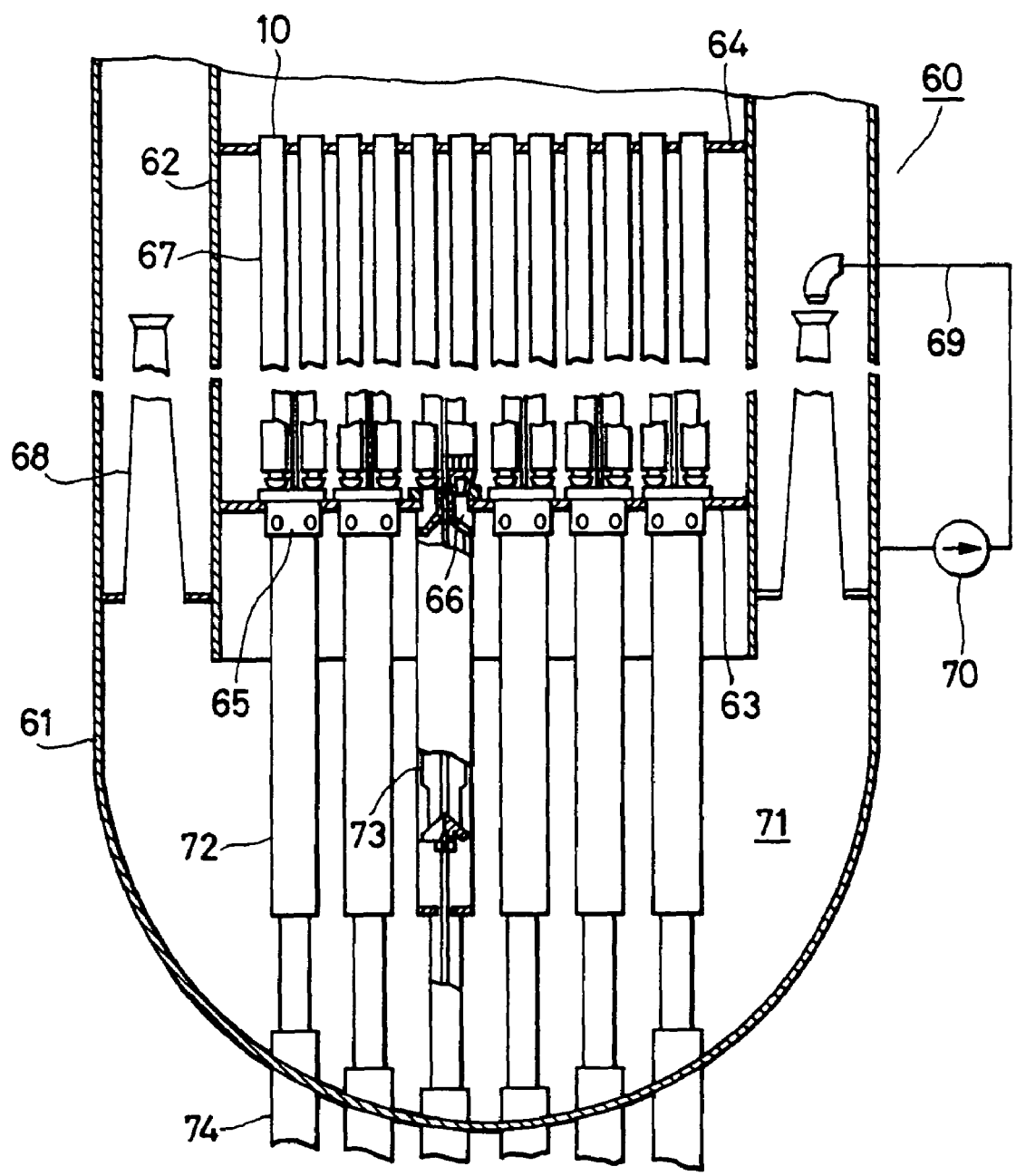
FIG. 33 is a local vertical section view of a boiling-water reactor in which the fuel assembly of FIG. 1 is loaded.

Finally, the structure of the boiling-water reactor in which the above-mentioned fuel assembly is loaded will now be described in conjunction with FIG. 33.

A boiling-water reactor 60 has a reactor pressure vessel 61, a recirculation pump 70 and a reactor core 67 loaded with the fuel assembly 10. A reactor core shroud 62 is arranged in the reactor pressure vessel 61 and is mounted therein. Jet pumps 68 are arranged between the reactor pressure vessel 61 and the reactor core shroud 62. A lower support plate 63 of the reactor core is mounted on the lower end of the reactor core shroud 62 and is arranged therein. A plurality of fuel support metal fittings 65 penetrate through the lower support plate 63 of the reactor core and are installed on the lower support plate 63 of the reactor core. Upper lattice plates 64 are arranged in the reactor core shroud 62 and are mounted thereon. A plurality of control rod guide tubes 72 are installed in a lower plenum 71 under the lower support plate 63 of the reactor core. Housings 74 of control rod drive devices are mounted on the bottom of the reactor pressure vessel 61. A recirculation conduit 69 which communicates the reactor pressure vessel 61 with the reactor core shroud 62 is open at the upper end of the jet pumps 68. The recirculation conduit 69 is provided with the recirculation pump 70. Control rods 73 are arranged in the control rod guide tubes 72, and are linked to control rod driving devices (not shown) installed in the housings 74 of the control rod drive devices. The lower tie plates 13 of the fuel assembly 10 are inserted in and are held by the fuel support metal fittings 65, and the upper ends thereof are supported by the upper lattice plates 64. Being driven by the control rod drive devices, the control rods 73 are inserted among the fuel assemblies 10 penetrating through the fuel support metal fittings 65.

The cooling water is supplied into the reactor core 67 as described below. That is, the recirculation pump 70 is driven, and the cooling water between the reactor pressure vessel 61 and the reactor core shroud 62 is injected to the upper end 35 of jet pump 68 through the recirculation conduit 69. The cooling water between the reactor pressure vessel 31 and the reactor core shroud 32 is further intaken by the jet pump 35 as the cooling water is injected. The cooling water delivered from the jet pump 35 flows into the lower plenum 71 and into the cooling water paths 66 of the fuel support metal fittings 65, and is supplied into the fuel assembly 10 via the lower tie plate 13.

When the nuclear reactor is producing the output of a low level, the control rods 72 are pulled out from the reactor core to increase the output of the nuclear reactor. The output of a high level of the nuclear reactor can be controlled by changing the number of revolutions of the recirculation pump 70 and by increasing or decreasing the flow rate in the reactor core.

By pulling out the control rods and by adjusting the flow rate in the reactor core, the nuclear reactor produces a rated 100% output with a flow rate in the reactor core of 80%. The operation for compensating the decrease of reactor output due to the consumption of the core material and the operation for shifting the flow condition in the water rod 19 from the condition of FIG. 3A to the condition of FIG. 3C, are performed by increasing the flow rate in the reactor core, i.e., by increasing the number of revolutions of the recirculation pump 70. With the recirculation pump running at a speed that produces the flow rate of smaller than 100% in the reactor core, the condition of FIG. 3A is established in the water rod 19 whereby the vapor is built up in the coolant descending path 26. With the recirculation pump running at a speed that produces the flow rate of greater than 110% in the reactor core, the condition of FIG. 3C is established in the water rod 19, and no vapor is built up. It can therefore be said that the recirculation pump 70 serves as means that controls the accumulating amount of voids (vapor) in the water rod 19.

The fuel assembly 35, 51 or 57 may be loaded in the reactor core 67 instead of the fuel assembly 10.

Furthermore, the recirculation pump 70 may be replaced by an internal pump that is mounted in the reactor pressure vessel 61.

According to the present invention, the range greatly increases in which the average void fraction of the fuel assembly changes relying upon a simple structure, and the nuclear fuel substances can be utilized very efficiently.

What is claimed is:

1. A method for operating a nuclear reactor having a reactor vessel, a plurality of fuel assemblies loaded in a core arranged inside the reactor vessel, wherein each of said plurality of fuel assemblies includes a plurality of fuel rods and at least one water rod therein, and a pump which regulates a flow rate of coolant supplied to the core, the method comprising the steps of:

raising a coolant surface formed between the coolant and a vapor in the at least one water rod by increasing the flow rate of the coolant supplied to the core based on increasing a number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing at least one of the fuel assemblies in the nuclear reactor, and before an end of the one fuel cycle; and further increasing the flow rate of coolant supplied to the core based on increasing the number of revolutions of the pump during another period after the one period to an end of the one fuel cycle in a state in which the at least one water rod is completely filled with the coolant.

2. A method according to claim 1, wherein each of said plurality of fuel assemblies include an upper tie plate, a lower tie plate, the plurality of fuel rods having upper end portions held by the upper tie plate and lower end portions held by a fuel rod holding portion of the lower tie plate, the fuel rods being each filled with a plurality of fuel pellets, and the at least one water rod being arranged among the fuel rods, a resistance member provided at a lower end portion of the fuel assembly, a coolant ascending path in which the at least one water rod has a coolant inlet port open in a region lower than the resistance member, and a coolant descending path which is communicated with the coolant ascending path and which has a coolant delivery port that is open in a region higher than the resistance member, in order to guide the coolant downwardly in an opposite direction to a direction in which the coolant flows in the coolant ascending path.

3. A method according to claim 2, wherein the resistance member is the fuel rod holding portion of the lower tie plate.

4. A method according to claim 2, wherein the coolant ascending path in the at least one water rod is located so as to extend beyond an upper end of a fuel pellet-filled region of the fuel rods of the at least one fuel assembly.

5. A method according to claim 2, wherein an upper end of the coolant ascending path in the at least one water rod is located at a position lower than an upper end of a fuel pellet-filled region of the fuel rods of the at least one fuel assembly.

6. A method according to claim 4, the coolant delivery port of the at least one water rod is located at a position near a lower end of the fuel pellet-filled region.

7. A method according to claim 2, wherein the coolant descending path of the at least one water rod is located so as to surround the coolant ascending path of the at least one water rod.

8. A method according to claim 1, wherein the coolant is cooling water.

9. A method for operating a nuclear reactor having a reactor vessel and at least one fuel assembly loaded in a core arranged inside the reactor vessel, the at least one fuel assembly having an upper tie plate, a lower tie plate, a plurality of fuel rods having upper end portions held by the upper tie plate and lower end portions held by a fuel rod holding portion of the lower tie plate, at least one water rod arranged among the fuel rods, and a resistance member at a lower end portion of the at least one fuel assembly, the plurality of fuel rods having a plurality of fuel pellets therein, and the at least one water rod having a coolant ascending path including a coolant inlet port which is open in a region lower than the resistance member, and a coolant descending path which is communicated with the coolant ascending path, the coolant descending path having a coolant delivery port open in a region higher than the resistance member, the coolant being guided downwardly in the coolant descending path in an opposite direction of the coolant flow in the coolant ascending path, the method comprising the step of regulating a flow rate of the coolant supplied to the core by a pump including the steps of:
    raising a coolant surface formed between the coolant and a vapor in the at least one water rod by increasing the flow rate of the coolant supplied to the core based on increasing a number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing at least one of the fuel assemblies in the nuclear reactor, and before an end of the one fuel cycle; and
    further increasing the flow rate of the coolant supplied to the core based on increasing the number of revolutions of the pump during another period after the one period to an end of the one fuel cycle in a state in which the at least one water rod is completely filled with the coolant and no vapor is present in the at the another period.

10. A method according to claim 9, wherein the step of raising the coolant surface includes increasing the flow rate of the coolant in the range of 0% to less than 110% of the flow rate during the one period and the step of further increasing the flow rate of the coolant includes increasing the flow rate above 110% of the flow rate during the another period.

11. A method for operating a nuclear reactor having a reactor vessel and at least one fuel assembly loaded in a core arranged inside the reactor vessel, the at least one fuel assembly having an upper tie plate, a lower tie plate, a plurality of fuel rods having upper end portions held by the upper tie plate and lower end portions held by a fuel rod holding portion of the lower tie plate, a plurality of water rods arranged among the fuel rods, and a resistance member at a lower end portion of the at least one fuel assembly, the plurality of fuel rods having a plurality of fuel pellets therein, and each of the water rods having a coolant ascending path including a coolant inlet port which is open in a region lower than the resistance member, and a coolant descending path which is communicated with the coolant ascending path, the coolant descending path having a coolant delivery port open in a region higher than the resistance member, the coolant being guided downwardly in the coolant descending path in an opposite direction of the coolant flow in the coolant ascending path, the method comprising the steps of:
    loading a plurality of the fuel assemblies in the reactor core; and
    controlling the amounts of voids accumulated in the water rods by regulating a number of revolutions of a pump supplying coolant to the core;
    wherein the step of controlling the amount of voids includes the step of regulating a flow rate of coolant supplied to the core including the steps of:
    raising a coolant surface formed between the coolant and a vapor in the water rods by increasing the flow rate of the coolant supplied to the core based on increasing the number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing at least one of the fuel assemblies in the nuclear reactor, and before an end of the one fuel cycle; and
    further increasing the flow rate of the coolant supplied to the core based on increasing the number of revolutions of the pump during the another period in a state in which the water rods are completely filled with the coolant and no vapor is present in the water rods at the another period.

12. A method according to claim 11, wherein the step of raising the coolant surface includes increasing the flow rate of the coolant in the range of 0% to less than 110% of the flow rate during the one period and the step of further increasing the flow rate of the coolant includes increasing the flow rate above 110% of the flow rate during the another period.

13. A method according to claim 1, wherein the at least one water rod includes a coolant ascending path having a coolant inlet port and a coolant descending path connected with the coolant ascending path at a top portion thereof so that all of the coolant supplied into the coolant ascending path is introduced into the coolant descending path in a downward direction opposite to the direction of the flow of the coolant in the coolant ascending path, the coolant descending path having a coolant delivery port.

14. A method according to claim 9, wherein the coolant descending path is communicated with the coolant ascending path at a top portion of the coolant ascending path so that all of the coolant supplied into the coolant ascending path is introduced into the coolant descending path in the downward direction opposite to the direction of the flow of the coolant in the coolant descending path.

15. A method according to claim 11, wherein the coolant descending path is communicated with the coolant ascending path at a top portion of the coolant ascending path so that all of the coolant supplied into the coolant ascending path is introduced into the coolant descending path in the downward direction opposite to the direction of the flow of the coolant in the coolant descending path.

16. A method for operating a nuclear reactor having a reactor vessel, a plurality of fuel assemblies loaded in a core arranged inside the reactor vessel, wherein each of said plurality of fuel assemblies includes a plurality of fuel rods and at least one water rod therein, and a pump which regulates a flow rate of coolant supplied to the core, the method comprising the steps of:

raising a coolant surface formed between the coolant and a vapor in the at least one water rod by increasing the flow rate of the coolant supplied to the core based on increasing a number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing a portion of the fuel assemblies in the nuclear reactor, and before an end of the one fuel cycle; and further increasing the flow rate of coolant supplied to the core based on increasing the number of revolutions of the pump during another period after the one period to an end of the one fuel cycle in a state in which the at least one water rod is completely filled with the coolant.

17. A method for operating a nuclear reactor having a reactor vessel and at least one fuel assembly loaded in a core arranged inside the reactor vessel, the at least one fuel assembly having an upper tie plate, a lower tie plate, a plurality of fuel rods having upper end portions held by the upper tie plate and lower end portions held by a fuel rod holding portion of the lower tie plate, at least one water rod arranged among the fuel rods, and a resistance member at a lower end portion of the at least one fuel assembly, the plurality of fuel rods having a plurality of fuel pellets therein, and the at least one water rod having a coolant ascending path including a coolant inlet port which is open in a region lower than the resistance member, and a coolant descending path which is communicated with the coolant ascending path, the coolant descending path having a coolant delivery port open in a region higher than the resistance member, the coolant being guided downwardly in the coolant descending path in an opposite direction of the coolant flow in the coolant ascending path, the method comprising the step of regulating a flow rate of the coolant supplied to the core by a pump including the steps of:

raising a coolant surface formed between the coolant and a vapor in the at least one water rod by increasing the flow rate of the coolant supplied to the core based on increasing a number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing a portion of the fuel assemblies in the nuclear reactor, and before an end of the one fuel cycle; and further increasing the flow rate of the coolant supplied to the core based on increasing the number of revolutions of the pump during another period after the one period to an end of the one fuel cycle in a state in which the at least one water rod is completely filled with the coolant and no vapor is present in the at the another period.

18. A method according to claim 17, wherein the step of controlling the amount of voids includes the step of regulating a flow rate of coolant supplied to the core including the steps of:

raising a coolant surface formed between the coolant and a vapor in the water rods by increasing the flow rate of the coolant supplied to the core based on increasing the number of revolutions of the pump during one period from a beginning of one fuel cycle, which one fuel cycle is an operation period of the nuclear reactor from when fuel assemblies in the nuclear reactor are replaced and operation of the nuclear reactor is started to when the nuclear reactor is stopped for renewing a portion of the fuel assemblies in the nuclear reactor, and before an end of the one fuel cycle; and further increasing the flow rate of the coolant supplied to the core based on increasing the number of revolutions of the pump during the another period in a state in which the water rods are completely filled with the coolant and no vapor is present in the water rods at the another period.

* * * * *